(12) United States Patent
Tobias et al.

(10) Patent No.: US 12,349,617 B2
(45) Date of Patent: Jul. 8, 2025

(54) SEEDMAT FOR GROWING PLANTS

(71) Applicant: GTX TURF FARMS LP, Santa Barbara, CA (US)

(72) Inventors: Andrew Tobias, Santa Barbara, CA (US); Bryan Foster, Santa Barbara, CA (US)

(73) Assignee: GTX TURF FARMS LP, Santa Barbara, CA (US)

( * ) Notice: Subject to any disclaimer, the term of this patent is extended or adjusted under 35 U.S.C. 154(b) by 254 days.

(21) Appl. No.: 17/292,095

(22) PCT Filed: Nov. 7, 2019

(86) PCT No.: PCT/US2019/060209
§ 371 (c)(1),
(2) Date: May 7, 2021

(87) PCT Pub. No.: WO2020/097292
PCT Pub. Date: May 14, 2020

(65) Prior Publication Data
US 2021/0400865 A1    Dec. 30, 2021

Related U.S. Application Data

(60) Provisional application No. 62/756,735, filed on Nov. 7, 2018.

(51) Int. Cl.
*A01C 1/04* (2006.01)
*A01G 24/46* (2018.01)

(52) U.S. Cl.
CPC ............. *A01C 1/044* (2013.01); *A01G 24/46* (2018.02)

(58) Field of Classification Search
CPC .......... A01C 1/044; A01C 1/04; A01G 24/46; A01G 24/44; A01G 24/35; A01G 20/20
See application file for complete search history.

(56) References Cited

U.S. PATENT DOCUMENTS

| | | |
|---|---|---|
| 5,226,255 A | 7/1993 | Robertson |
| 6,070,358 A | 6/2000 | Meikle et al. |
| 6,219,965 B1 | 4/2001 | Ishikawa et al. |
| 6,324,781 B1 | 12/2001 | Stevens |
| 6,358,295 B1 | 3/2002 | Tabei et al. |

(Continued)

FOREIGN PATENT DOCUMENTS

| | | | | |
|---|---|---|---|---|
| EP | 1929079 B1 * | 3/2012 | ............. | B05C 5/001 |
| KR | 20140110246 A * | 9/2014 | ............. | A01G 24/23 |

(Continued)

OTHER PUBLICATIONS

Machine translation of KR-20140110246-A to Jeong, published Sep. 2014. (Year: 2014).*

(Continued)

*Primary Examiner* — Morgan T Jordan
(74) *Attorney, Agent, or Firm* — Saul Ewing LLP

(57) ABSTRACT

A seedmat for growing plants, the seedmat comprises a biodegradable base layer, a seed layer and a biodegradable cover layer. The seed layer includes fertilizer granules or pellets that each have a coating, such as a polymer coating, that enables the pellets to absorb water and to slowly release that water, together with fertilizer.

31 Claims, 14 Drawing Sheets

(56) References Cited

U.S. PATENT DOCUMENTS

| | | | |
|---|---|---|---|
| 7,059,083 B2* | 6/2006 | Abitz | A01G 20/20 |
| | | | 47/9 |
| 9,440,411 B2* | 9/2016 | Hellwig | A01G 20/20 |
| 9,616,442 B2 | 4/2017 | Kaeb et al. | |
| 2003/0000139 A1* | 1/2003 | Anderson | A01C 1/044 |
| | | | 47/56 |
| 2004/0060677 A1* | 4/2004 | Huang | A01C 1/044 |
| | | | 162/158 |
| 2010/0050514 A1* | 3/2010 | Wissemeier | A01G 24/12 |
| | | | 71/27 |
| 2014/0290133 A1* | 10/2014 | Seacord | A01C 1/044 |
| | | | 47/56 |
| 2017/0172082 A1 | 6/2017 | Weiss et al. | |

FOREIGN PATENT DOCUMENTS

| | | | | |
|---|---|---|---|---|
| WO | 1998/056232 A1 | 12/1998 | | |
| WO | 2007084550 A2 | 7/2007 | | |
| WO | WO-2010085075 A2 * | 7/2010 | | E02B 3/122 |
| WO | 2018007585 A1 | 1/2018 | | |

OTHER PUBLICATIONS

Machine translation of EP-1929079-B1 to Brune, published Mar. 2012. (Year: 2012).*
Merged translation of WO_2010085075 (Year: 2010).*
International Search Report, dated Jan. 23, 2020, issued in International Application No. PCT/US19/060209.

* cited by examiner

| Sample Number | Cover Layer 40 | Base Layer 20 |
|---|---|---|
| Sample 1 | Tissue - 13 pounds per 3000 square feet | Tissue - 22 pounds per 3000 square feet |
| Sample 2 | Tissue - 13 pounds per 3000 square feet | Airlaid - 100 grams per square meter |
| Sample 3 | Tissue - 13 pounds per 3000 square feet | Airlaid - 75 grams per square meter |
| Sample 4 | Tissue - 13 pounds per 3000 square feet | Airlaid - 50 grams per square meter |
| Sample 5 | Airlaid - 50 grams per square meter | Airlaid - 50 grams per square meter |
| Sample 6 | Airlaid - 75 grams per square meter | Airlaid - 75 grams per square meter |

FIGURE 10

TABLE 1

| Sample ID | Material | Construction Description | Tensile (N/cm) | Dry Caliper (mm) | Wet Caliper (mm) | BW (gsm) | Dry Density (g/cc) | Wet Density (g/cc) | Porosity (0.3 min/l) | Overall Rating |
|---|---|---|---|---|---|---|---|---|---|---|
| 1. | Control | | X | X | X | X | X | X | X | |
| 2. | Paper Towel A | Top & Bottom | 2.7 | 0.53 | 0.33 | 50 | 0.09 | 0.15 | 29.80 | Fair |
| 3. | Pulp Sheet A | Top & Bottom | 46.1 | 0.35 | 0.50 | 150 | 0.43 | 0.30 | N/A | Poor Top |

FIGURE 11

TABLE 1-continued

| Sample ID | Material | Construction Description | Tensile (N/cm) | Dry Caliper (mm) | Wet Caliper (mm) | BW (gsm) | Dry Density (g/cc) | Wet Density (g/cc) | Wet Porosity (ft.3/min/ft) | Overall Rating |
|---|---|---|---|---|---|---|---|---|---|---|
| 4. | Blotter Sheet | Top & Bottom | 63.7 | 0.59 | 0.83 | 273 | 0.46 | 0.33 | N/A | Poor Top |
| 5. | Pulp Sheet B | Top & Bottom | 69.7 | 0.63 | 1.04 | 300 | 0.47 | 0.29 | N/A | Poor Top |
| 6. | Dexter Material | Top & Bottom | 6.8 | 0.36 | 0.43 | 57 | 0.16 | 0.13 | 162.00 | Good |
| 7. | Pulp Sheet C | Top & Bottom | 7.6 | 0.32 | 0.52 | 60 | 0.19 | 0.12 | 24.60 | Fair |
| 8. | Reclaim Packing Material | Top & Bottom (3 ply for both) | 5.8 | 1.93 | 0.88 | 169 | 0.09 | 0.19 | 43.00 | Good |
| 9. | Pulp Sheet D | Top & Bottom | 27.0 | 0.27 | 0.41 | 100 | 0.37 | 0.24 | N/A | Poor Top |
| 10. | Hydro Entangled Airlaid Material | Top & Bottom | 3.2 | 0.85 | 0.77 | 113 | 0.13 | 0.15 | 94.60 | Fair |
| 11. | Paper Towel B | Top & Bottom | 3.7 | 0.63 | 0.71 | 39 | 0.06 | 0.05 | 193.00 | Excellent |
| 12. | Paper Towel C | Top & Bottom | 2.4 | 0.64 | 0.71 | 71 | 0.11 | 0.10 | 119.00 | Excellent |
| 13. | Tissue A | Top & Bottom | 1.0 | 0.17 | 0.13 | 23 | 0.14 | 0.17 | 110.00 | Excellent |
| 14. | Towel D | Top & Bottom | 1.9 | 0.17 | 0.16 | 28 | 0.16 | 0.18 | 52.20 | Good |
| 15. | Airlaid Material A | Top & Bottom | 2.2 | 0.77 | 1.32 | 94 | 0.12 | 0.07 | 127.00 | Poor Top |
| 16. | Split Thermo Airlaid Material and Tissue | Material Separated Tissue Top & AL Pulp Mass Bottom | 1.5 | 0.17 | 0.19 | 18 | 0.10 | 0.10 | 245.00 | Excellent |
| | | | 0.9 | 0.79 | 1.00 | 80 | 0.10 | 0.08 | 312.00 | N/A |
| 17. | Airlaid Material A & 300 gsm Pulp Sheet | BTAL Top & 300 gsm Bottom | 2.2 | 0.77 | 1.32 | 94 | 0.12 | 0.07 | 127.00 | N/A |
| | | | 69.7 | 0.63 | 1.04 | 300 | 0.47 | 0.29 | N/A | |
| 18. | 100% Fluff Airlaid w/o Tissue | Top & Bottom | 1.1 | 0.67 | 0.43 | 59 | 0.09 | 0.14 | 245.00 | |

FIGURE 12

SEEDMAT FOR GROWING PLANTS

BACKGROUND OF THE INVENTION

1. Field of the Invention

The present invention relates to a seedmat for growing plants, such as grass, and a production process for the efficient mass production of these seedmats.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Gardeners now have the choice of many different methods to grow grass, such as planting seeds directly on soil or rolling out turf or sod on prepared soil.

Another known method for growing grass includes the use of a seedmat comprising a biodegradable fiber or paper that has been pre-seeded. Seedmats are lightweight and easy to install, and have been used on golf courses, sports fields, highways, or construction lawns. However, existing solutions using seedmats are often expensive and may still grow grassy patch. Seeds may also fall out when unpacking the mats.

A solution is needed that would not only be easy to apply but that would also provide fast germination speed and consistent growth density throughout.

SUMMARY OF THE INVENTION

This specification discloses the following improvements A-J to seedmat systems:

A. A seedmat comprising a biodegradable base layer, a seed distribution and a biodegradable cover layer;
   in which the seed distribution includes fertilizer granules or pellets that each have a coating, such as a polymer coating, that enables the pellets to absorb water and to slowly release that water, together with fertilizer.

B. A seedmat comprising a biodegradable base layer, a seed distribution and a biodegradable cover layer;
   in which the cover layer is treated with or otherwise includes a bird repellent.

C. A seedmat comprising a biodegradable base layer, a seed distribution and a biodegradable cover layer;
   in which the cover layer is treated with or otherwise includes a visual moisture indicator.

D. A seedmat comprising a biodegradable base layer, a seed distribution and a biodegradable cover layer;
   in which the seedmat also includes a layer configured to resist burrowing by animals such as moles and gophers but to permit roots to pass through.

E. A seedmat comprising a biodegradable base layer, a seed distribution and a biodegradable cover layer;
   in which the seedmat also includes a biodegradable water retention layer, the water retention layer being configured to retain water longer than any of the other layers, to provide water to the seeds in dry conditions.

F. A seedmat comprising a biodegradable base layer, a seed distribution and a biodegradable cover layer;
   in which one or more of the layers are treated with or otherwise include biodegradable water retention substances, such as corn starch crystals, that function to retain water and to release that water slowly over a predefined or required time period and that also function as an adhesive to bind the base and cover layers together.

G. A seedmat comprising a biodegradable base layer, a seed distribution and a biodegradable cover layer;
   in which one or more of the layers are treated with or otherwise include biodegradable water retention substances, such as corn starch crystals, that function to retain water and to release that water slowly over a predefined or required time period and that also function as an adhesive to stick the base layer, shaped when wet to highly conform to the soil on which it rests, to that soil.

H. A seedmat comprising a biodegradable base layer, a seed distribution and a biodegradable cover layer;
   in which the seedmat includes fertilizer and the seedmat is configured as part of a hydroponic system which requires water, but nutrition is provide in whole or part through the fertilizer in the seedmat.

I. A seedmat comprising a biodegradable base layer, a seed distribution and a biodegradable cover layer;
   in which the seedmat includes fertilizer and the seedmat is configured as part of a saline filtration system, and the biodegradable cover layer is configured to filter the saline so that water that is substantially less saline passes down to the seeds in the seed distribution.

J. A method of manufacturing a seedmat comprising a biodegradable base layer, a seed distribution and a biodegradable cover layer;
   in which adhesive is sprayed onto one or both of the base layer or the cover layer, and that adhesive secures seeds in position; and in which the adhesive is applied using a centrifugal spray apparatus with multiple rotating spray heads.

K. The seedmat of any of feature A-J, the seedmat further comprising an artificial turf layer located on top of the biodegradable cover layer.

Note that any of the above key features A-K can be combined with any other key feature.

The following optional features can also be combined with any key feature and also any other optional feature:
   a biodegradeable layer is made of a nonwoven material.
   the nonwoven material is a cellulose nonwoven material.
   the top and bottom layers are made of nonwoven cellulose fibres, and there is a layer or other distribution of fertilizer pellets, and a layer or other distribution of seeds mixed in with the fertilizers and all are distributed onto a wet glue or adhesive layer sprayed on the bottom layer.
   fertilizer pellets and seeds are distributed substantially evenly onto the wet glue.
   the wet glue is applied substantially evenly onto one of the layers using a centrifugal spray apparatus with multiple rotating spray heads.
   the glue is a synthetic adhesive.
   the glue is corn starch.
   the grass seeds are passed through a gravity hopper feeding a brushed roller that evenly distributes the seed onto the wet, glued base layer surface so that the seed are maintained in position.
   the fertiliser pellets are sprayed or sprinkled onto the wet glued base layer surface, and evenly distributed across the seeds.

the non-woven fabric is bio-degradable, highly water absorbent layer that, when wet, highly conforms to the substance the non-woven layer is resting on—e.g. the soil.

the nonwoven fabrics are configured to be strong enough when dry to enable high speed unrolling from a pair of large rolls of the fabric, high speed transit of the nonwoven fabrics through the manufacturing line that applies, glue or adhesive, fertiliser and seed, and completes the manufacture of the finished article.

the top non-woven layer is combined at high speed with the base layer, sandwiching the glued seeds and fertiliser pellets in position and creating a single, bonded structure, with the glue also binding the top and base layers together and this bonded structure is then passed at high speed between loaded rollers which further binds the top and base layers together and the composite is then wound at high speed to form a large roll of the finished article.

the fertiliser pellets have a polymer coating through which water can pass via osmosis so that the nutrients within a pellet are then slowly dissolved by the absorbed water but are not immediately released from the pellet but instead retained within the polymer wall of the pellet and only released over time, such as 30-50 days, or a time selected to be appropriate to support the germination and growth of the seeds in the seedmat.

the pellets are controlled release fertiliser pellets.

the top biodegradable layer includes a visual moisture indicator, such as a color-changing additive, to indicate when the mat needs watering.

the visual moisture indicator is configured to spell a brand name or replicate logo.

if the mat is sufficiently watered, then a word or logo becomes visible.

if the mat is insufficiently watered, then a word or logo becomes visible.

the seedmat includes a fine mesh layer that is resistant to burrowing animals.

the fine mesh is a nylon mesh.

the fine mesh is biodegradable, but at a rate that is considerably slower than the rate at which the top and base layers degrade.

the fine mesh is biodegradable only in sunlight or other conditions that do not apply whilst it is in the soil.

the seedmat includes a biodegradable water retention layer that is adjacent to the base layer.

the biodegradable water retention layer is a thick layer of nonwoven cellulose, configured for maximum slow release water absorption.

the biodegradable water retention layer includes additional water retention substances, such as corn starch crystals.

the seedmat includes a tackifier layer that contributes to the base layer conforming and sticking to the soil.

the seedmat is used as part of a hydroponic system which requires water but nutrition is provide in whole or part through the fertilizer in the seedmat.

BRIEF DESCRIPTION OF THE FIGURES

Aspects of the invention, implemented in a system called the GROTRAX seedmat, will now be described, by way of example(s), with reference to the following Figures, which each show features of the invention:

FIG. 10 lists the different combination of cover layers and base layers used for the various samples.

FIGS. 11-12 lists tests results of various samples.

DETAILED DESCRIPTION

Figure 1:
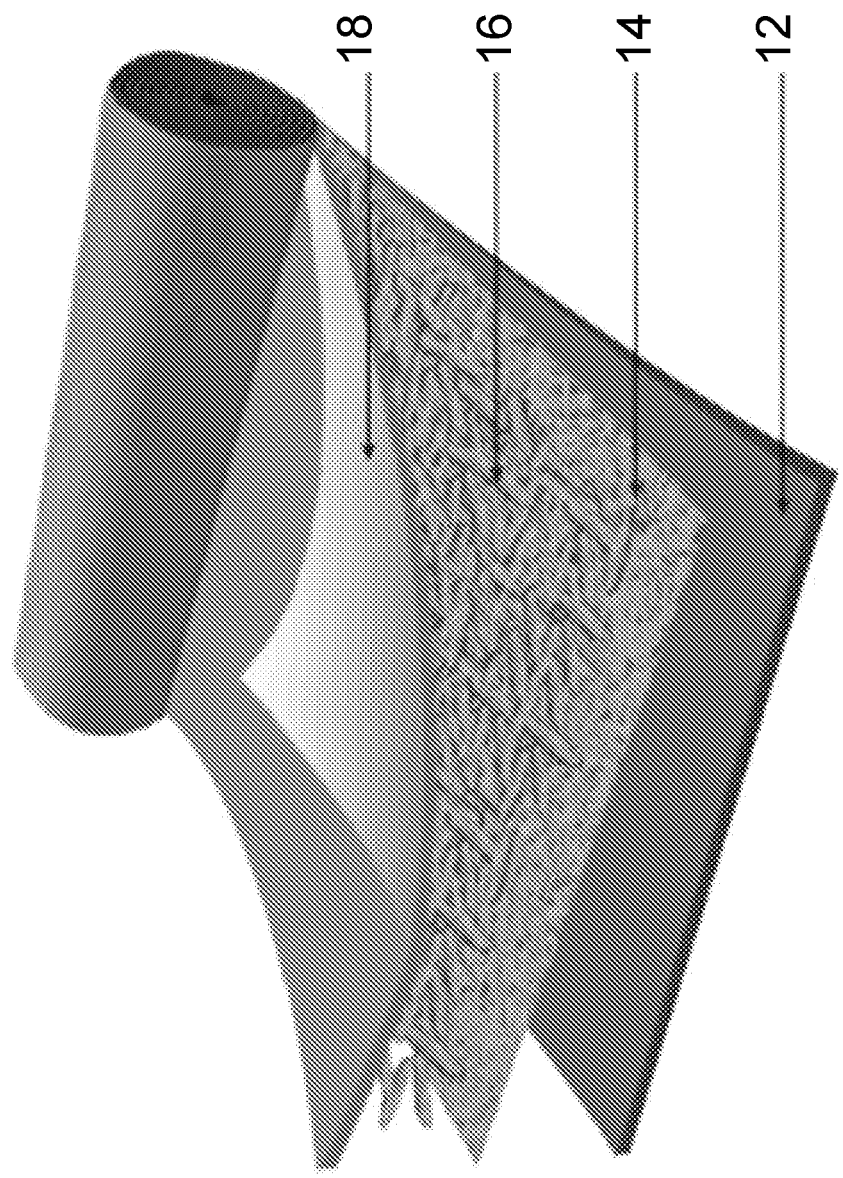
FIG. 1 shows a 'standard' GROTRAX seedmat composition: top and bottom layers of nonwoven cellulose fibres, and a layer of fertilizer pellets, and a layer of seeds, typically mixed in with the fertilizers and all evenly distributed onto a wet glue or adhesive layer sprayed on the bottom layer.

Section 1 is a detailed description of the different seedmat compositions.

Section 2 is a detailed description of the different seedmat compositions combined with an artificial turf.

Section 3 provides a summary of the most important high-level features.

Appendix 1 is a detailed description of some features of the GROTRAX seedmat system, corresponding to U.S. Pat. No. 7,059,083.

We will start with an overview of the biodegradable layers. In one implementation, the biodegradable layers (i.e. the base layer and the cover layer) are made from a nonwoven fabric, such as a cellulose nonwoven fabric. VICELL® Airlaid from Georgia Pacific Nonwovens LLC is suitable. Other nonwovens made using cellulose pulp and a copolymer, typically a vinyl acetate ethylene copolymer, may also be suitable. The key properties are for the nonwoven fabric to be bio-degradable, highly water absorbent and, when wet, highly conforming to the substance the non-woven layer is resting on—i.e. soil. This soil conformance ensures that there is very good physical contact between the non-woven base layer, even with granular or lumpy soil, which in turn provides excellent contact between the grass or plant roots as they grow through the base layer and into the soil.

High speed manufacturability is also important and we will summarise that now. Another requirement is for the nonwoven fabrics to be strong enough when dry to enable high speed manufacturing of the finished article: in a high speed manufacturing line, a pair of large rolls of the nonwoven fabric can feed their fabric at high speed through the manufacturing line (shown schematically as Substrate 1 and Substrate 2 in FIG. 5) and for glue to be sprayed onto the base layer, and for seed to be then evenly distributed onto the glue and very small fertiliser pellets to be sprayed onto the seeds; the glue keeps the seeds and fertiliser in position. The glue can be a synthetic glue, or corn starch, or any other suitable glue. The glue is sprayed on using a rotor spray coating system. The grass seeds are passed through a gravity hopper feeding a brushed roller that evenly distributes the seed onto the wet, glued base layer surface so that the seed are maintained in position. The fertiliser pellets are then sprayed or sprinkled onto the wet glued base layer surface, evenly distributed across the seeds; as the glue is still wet, the fertiliser pellets are also maintained in position.

The fertiliser pellets should be highly water absorbent; they will typically have a polymer coating through which water can pass via osmosis; the nutrients within a pellet are then slowly dissolved by the absorbed water but, importantly, the nutrients are not immediately released from the pellet but instead retained within the polymer wall of the pellet and only released over time, ensuring that nutrients and water can be provided to the growing seeds from the pellets over their critical growth phase. Because the fertiliser pellets are evenly distributed across the base layer together with the seeds, and both fertiliser and seeds have been glued into position and sandwiched between the top and bottom nonwoven cellulose layers, substantially all of the growing seeds have a nearby source of both nutrients and water. The polymer coating is biodegradable and hence eventually fully breaks down in the soil. The pellets can be controlled release fertiliser pellets.

Returning to the high speed manufacturing process, the top non-woven layer is then combined at high speed with the base layer, sandwiching the glued seeds and fertiliser pellets in position and creating a single, bonded structure, with the glue also binding the top and base layers together; this bonded structure is hence made up of the top and base layers, with seed and fertiliser in between. This bonded structure is then passed at high speed between loaded rollers which further binds the top and base layers together and the composite is then wound at high speed to form a large roll of the finished article. This enables fast and efficient, high volume manufacture of the seedmat.

The main constituents of the seedmat are:

| Cellulose pulp | CAS: 65996-61-4 | %: 45-70 |
| Vinyl Acetate Ethylene Copolymer | Proprietary | %: 1.5-21 |
| Urea | CAS: 57-13-6 | % 2.5-5 |
| Polymer Coating | N/A | %: 0.1-0.5 |
| Kaolin | CAS: 1332-58-7 | % 0.02-0.1 |

The following sections further describe one implementation of the invention.

Section 1—Seedmat Composition

FIG. 1 shows a 'Standard' seedmat composition made up of 4 different layers.

The standard mat comprises:
(a) a biodegradable base layer 12; this is typically a cellulose nonwoven layer. It could also be a woven or laminate structure.
(b) a highly water absorbent fertilizer layer 14; polymer coated slow release fertilizer pellets that absorb water and release that water, together with nutrients, over a prolonged period (e.g. 30 days or 50 days etc.) appropriate to support the germination and root growth and establishment of the specific seeds. The pellets are evenly distributed on a layer of wet glue sprayed on the biodegradable base layer 12 using an array of centrifugal sprayers with multiple rotating spray heads; this design will not readily clog with adhesive;
(c) a premium seed layer 16, adjacent to or mixed in together with the super absorbent fertilizer pellets 14 and evenly distributed on the layer of wet glue sprayed onto the base layer 12;
(d) a biodegradable layer 18 as a top layer; this is typically a cellulose nonwoven layer, similar to the base layer 12, but that will typically break down faster than the base layer 12. It could also be a woven or laminate structure.

A method for making a seedmat for growing grass is now described in outline (Appendix 1 includes further detail). An array of centrifugal sprayers with multiple rotating spray heads sprays adhesive onto a thin sheet of fast moving cellulose base layer 12 that is unrolled from a large roll and passed through the manufacturing line. An adhesive such as Aquagrip® 5128A from Bostik Inc. is suitable.

Highly water absorbent fertilizer pellets (or some other form of highly water absorbent fertilizer) are evenly distributed from a hopper onto the fast moving base layer 12 sheet and stick to the wet glue on that base layer 12. Seeds 16 are then evenly distributed from a hopper onto the wet glue on the fast moving base layer 12 sheet. Alternatively, the seeds can be distributed first onto the wet glue on the fast moving base layer 12 sheet, followed by the fertilizer. Using highly water absorbent fertilizer pellets ensures that sufficient nutrients and water is held in the vicinity of the seeds and slowly released to them, instead of just heading straight down onto the soil and being unavailable to the seeds. The seeds can therefore develop strong and deep roots.

The top biodegradable layer 16 is then added on top of the seed layer, creating a sealed sandwich with the seeds and fertilizer held in an even or regular distribution, leading to uniform growth and few patchy, uneven areas of grass etc. Further, rain will not be able to wash the seeds away, nor will wind or watering blow the seeds away, nor will birds or other animals be able to eat the seeds, since they are protected by the top layer.

In addition, the top biodegradable layer 16 could also be treated with bird or other animal repellent.

The top biodegradable layer 16 may also include a visual moisture indicator, such as a color-changing additive, to indicate when the mat needs watering. For example, dark green may indicate when the mat is sufficiently watered, and off white may indicate when the mat is not hydrated enough. The visual moisture indicator could be configured to spell a brand name or replicate a logo (such as 'GROTRAX'): for example, if the mat is sufficiently watered, then the word GROTRAX could be visible.

The nonwoven cellulose paper already holds 6× its weight in water; this means that water stays with or close to the seed, where it's needed for germination, whereas normal watering causes water to immediately be absorbed into the soil, heading downwards and away from the new seed. Adding water retention crystals to the base layer, alongside the seeds and fertilizer pellets (such as corn starch type water retention crystals) holds further moisture where it is needed; the crystals give the water back to the paper on demand (when the paper is sufficiently dry) and the paper in turn gives moisture to the seed. The benefits are better, stronger germination and less water needed, less often.

Slow release fertilizer applications may still tend to go down into the soil and away from the seeds. However, the natural wicking process of the cellulose nonwoven paper allows for an even distribution of the fertilizer by carrying the diluted fertilizer to all areas of the paper and thus touching all seeds. Less fertilizing is also needed from trapping the fertilizer on the surface only where it is needed and preventing it in part from heading down into the soil.

As discussed, water and fertilizer are needed on the surface of the cellulose nonwoven paper in close proximity with the seed, until the seed germinates and starts sending roots down into the soil. However on germination, when roots are starting to grow into the soil, it becomes important that the water and fertilizer head down into the soil and attract the roots to burrow down for stronger more resilient plant health.

The cellulose nonwoven paper is adapted to biodegrade following repeated watering. Therefore the stronger the roots get, the more the cellulose nonwoven paper biodegrades until the bio paper blends completely into the soil.

Hence, repeated watering causes the cellulose nonwoven paper to biodegrade into the soil holding a % of the moisture mix at the surface, whilst also allowing more water/fertilizer mix to head down into the soil along with the burrowing roots.

Additionally, the biodegradation process into the soil also changes the properties of the soil. The soil aerates and allows for easier new root growth and better water drainage down to the deep roots structures.

The different mats can be supplied as a roll, and can be rolled directly on prepared soil. The mats are easy to install and allow for stronger root system development without transplantation or sensitivity issues. They also simply cut to size in any shape and rest in place where grass is needed to grow. This also makes them ideal for uneven terrain, slopes and hillsides.

Unlike conventional turfs or sods, the mats are more shade tolerant because they are directly grown from seeds where they will live.

General pesticides (synthetic or organic) may also be embedded in between any of the layers.

Figure 2:
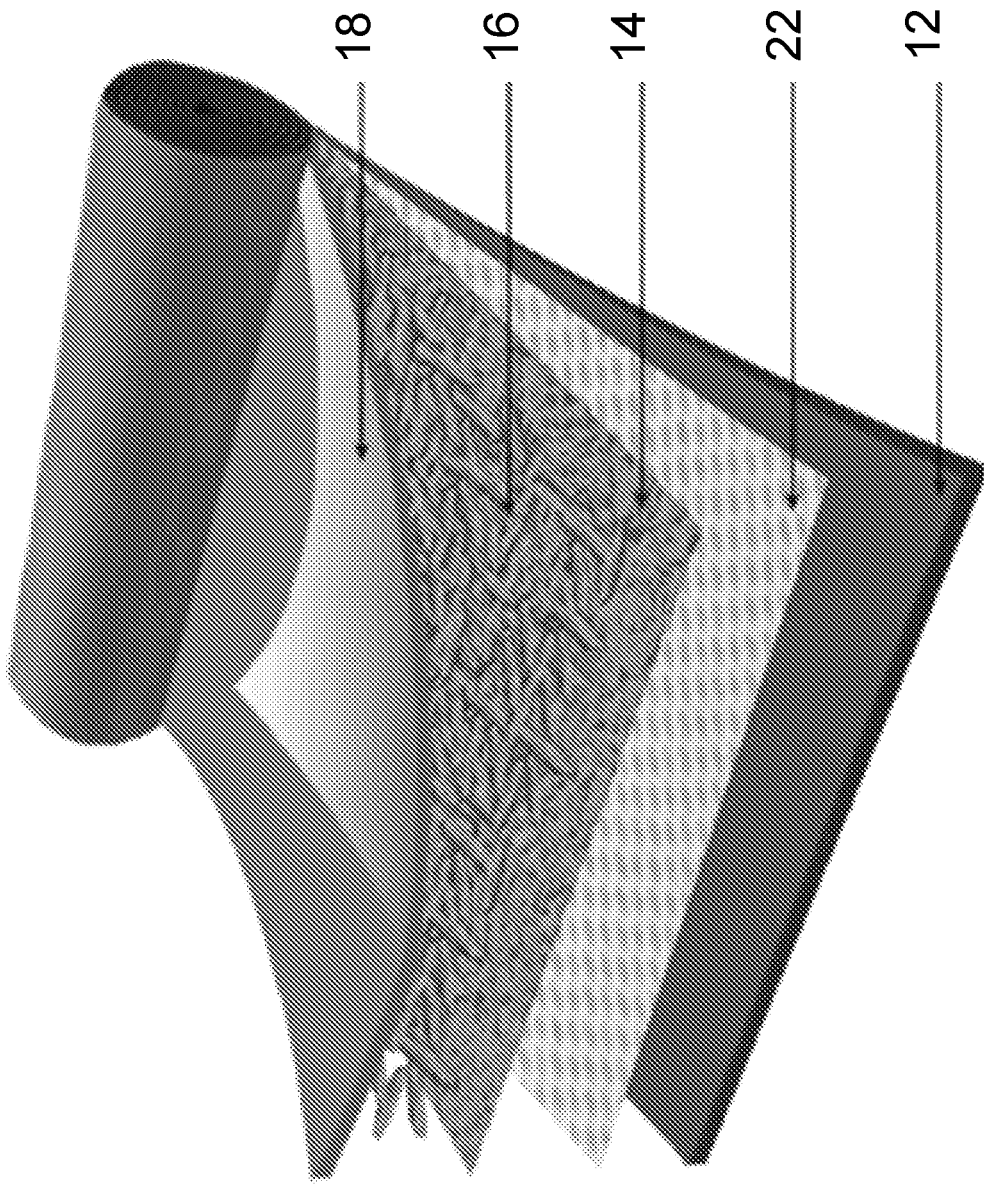
FIG. 2 shows a 'Critter' mat composition made up of 5 different layers: like the 'standard' GROTRAX seedmat, but including an additional layer of material configured to step burrowing animals from digging through the seedmat.

FIG. 2 shows a 'Critter' mat composition. The critter mat comprises:
(a) a biodegradable base layer 12;
(b) a critter or animal control mesh layer 22, lying over (or alternatively, under) the biodegradable base layer 12;
(c) a highly water absorbent fertilizer layer 14;
(d) a premium seed layer 16;
(e) a biodegradable layer 18 as a top layer.

This is essentially the same seedmat as described above, but with the addition of an additional mesh layer 22, typically between the biodegradable base layer 12 and top layer 18 in order to keep the mesh 22 in position. The mesh can be a fine nylon mesh, of the sort used on the back of turf sods. The mesh 22 helps prevent gopher and moles burrowing up through the new lawn, during and after growth. The mesh will typically have square holes, approximately 10 mm×10 mm in size, giving adequate space for root growth. It may be biodegradable, but at a rate that is considerably slower than the rate at which the top and base layers degrade. Alternatively, it may be not biodegradable at all, or biodegradable only in sunlight or other conditions that do not apply whilst it is in the soil.

Figure 3:
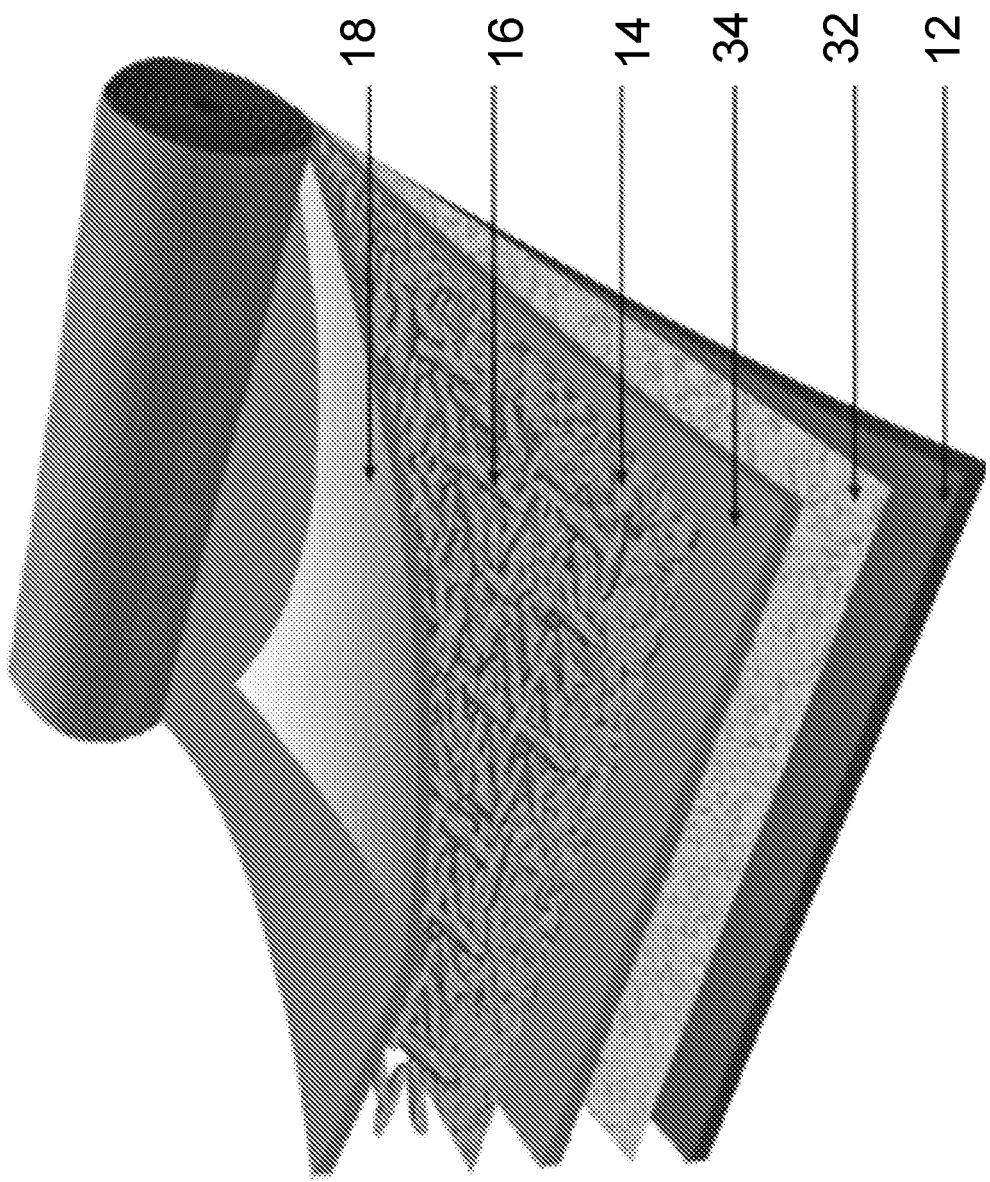
FIG. 3 shows a 'Drought resistant' seedmat.

FIG. 3 shows a 'Drought' mat composition. The drought mat comprises:
(a) a biodegradable base layer 12;
(b) a "tackifier" or adhesive layer 32, adjacent to the biodegradable base layer 12;
(c) a biodegradable highly water absorbent layer 34, laid over the tackifier layer 32;
(d) a highly water absorbent and fertilizer layer 14, laid over the biodegradable water absorbent layer 34;
(e) a seed layer 16;
(f) a biodegradable top layer 18.

This is essentially the same seedmat as described above in FIG. 1, but with the addition of an extra biodegradable layer 34 that is highly water absorbent and releases stored water slowly, supporting seed growth over extended drought conditions. This can be a thick layer of nonwoven cellulose, configured for maximum slow release water absorption. It can include substances specifically designed to absorb and retain water and to slowly release that water, such as cornstarch crystals. The separate tackifier or adhesive layer can be dispensed with if the highly water absorbent layer itself provides adhesion: corn starch crystals provide both adhesion and are highly water absorbent, releasing water slowly to their environment. Corn starch crystals will function as an adhesive or 'tackifier' to stick the base layer, which becomes shaped when wet to highly conform to the soil on which it rests, to that soil. This greatly increases the soil contact that seeds and their starting roots can enjoy; this is key to strong root development.

Another implementation is essentially the same seedmat as described above in FIG. 1, but includes an adhesive or 'tackifier' layer that sticks the base layer, which becomes shaped when wet to highly conform to the soil on which it rests, to that soil. As noted above, this greatly increases the soil contact that seeds and their starting roots can enjoy; this is key to strong root development. Corn starch type water retention crystals can be used for this purpose.

Although in this description, growing grass is used as an example, the seedmats may also be used for growing any other plants.

Examples of alternative iteration and uses are, but not limited to, the following:
General vegetable farming.
Specific vegetation growth, e.g. corn for the production of ethanol.
Desert growing conditions, e.g. growing on sand, hybrid hydroponic system as all the nutrition is in the paper so all that is needed is water.
Natural filtration system for saline/ocean water . . . the top layer or web acts like a filter keeping the heavy salt concentration on the surface and the purer water to filter down to the seed and into the soil or sand.
Multiple layers of paper are possible, each with any one of the above properties, massive water retention, natural bird control, enhanced filtration, enhanced erosion control.
Shipping a ready to go growing medium embedded with any seed varietal, vegetable, grasses, herb etc.

Section 2: Hybrid GROTRAX Artificial Turf System

The GROTRAX seedmat system may also be combined with artificial turf. This may be particularly useful for areas subjected to hard repeated wear.

Artificial turf (AT) is resilient and hardwearing. However it may be hot and harsh on the skin when friction with the skin occurs for example in games with contact such as football. In addition, concerns of bacterial growth have often been associated with artificial turf.

Grass is known to be environmentally friendly, comfortable and soft. However grass may suffer from wear and may also need replanting, which can often become expensive and time consuming. It is also unusable while being regrown.

A combination of a GROTRAX seedmat with AT would combine the resilience of AT with all the comfort and health benefits of real grass.

Other key advantages of the hybrid GROTRAX/AT system include, but are not limited to:
AT combined with GROTRAX provides further protection to: grass root, seedlings, seeds as they grow, a growing young plant and ultimately the adult root. By protecting the actual grass root, even if an area gets constant wear from continual use, the grass root remains protected and continues to grow.
It provides a more pleasing and aesthetic look. The hybrid GROTRAX/AT system always looks green and grass like whether or not the real grass has been damaged or not. As an example, whereas the high concentration of nitrogen in dog urine quickly kills grass and leaves a brown patch, with the hybrid GROTRAX/AT system the AT remains green. Therefore there is less visible evidence of damage. As another example, a pathway that is getting constant wear typically ends up as a dirt path with grass on either side. However, the hybrid system always looks green while a percentage of GROTRAX continues to grow within the protection of the AT.

The hybrid GROTRAX/AT system is useable while grass grows or regrows following repeated wear.

GROTRAX and AT may be laid together at the same time, with the GROTRAX layer for example being laid first followed by the AT layer. The grass is then mown when it has grown near or beyond the height of the AT.

Figure 13:
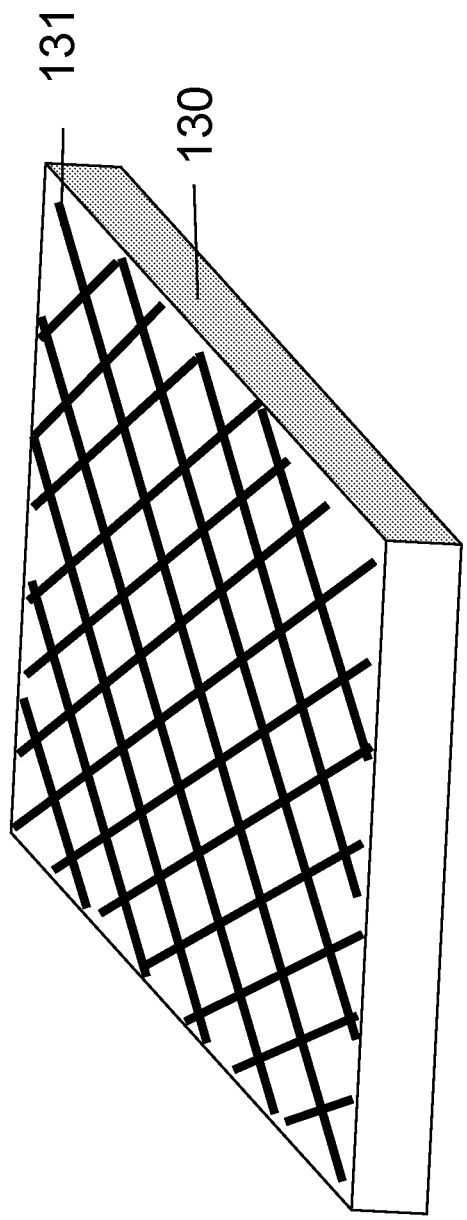
FIG. 13 shows a multi-layer hybrid GROTRAN/AT article.
Figure 14:
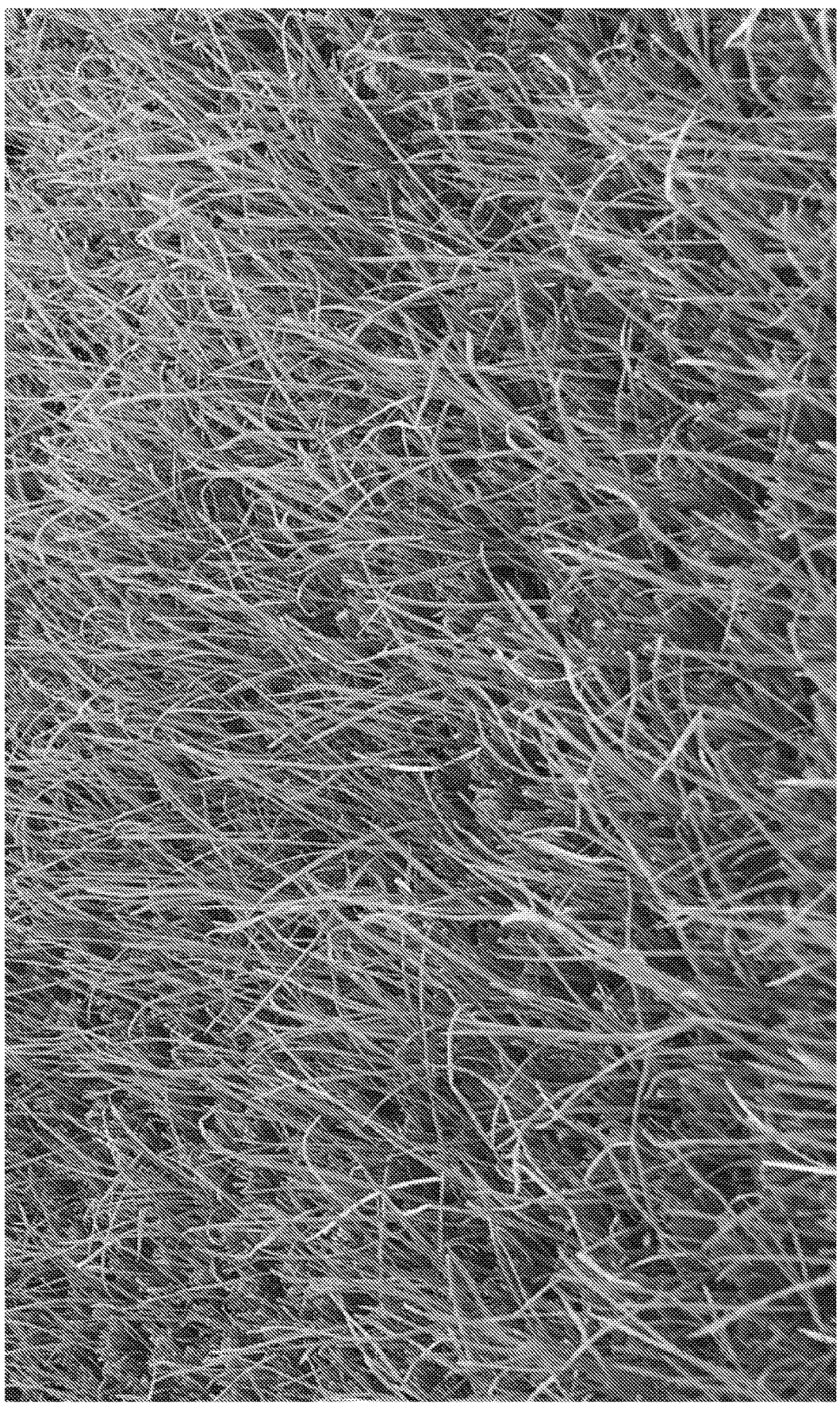
FIG. 14 shows a picture of the hybrid GROTRAN/AT article.

FIG. 13 shows a multi-layer hybrid GROTRAX/AT system comprising of a GROTRAX layer (130) and an AT layer (131). Here, the AT is constructed in a criss-cross pattern with holes allowing grass seeds in the GROTRAX layer to grow through and combine with it, as shown in the picture in FIG. 14.

The hybrid multi-layer article may comprise separate GROTRAX and AT layers. Alternatively, AT and GROTRAX layers may be manufactured as a single combined multi-layer article, which is a combination of GROTRAX and AT.

The finished articles may be produced in huge industrial rolls and then 'converted' down into the size necessary for its intended purpose.

Section 3: Key Features

This section summarises the most important high-level features; an implementation of the invention may include one or more of these high-level features, or any combination of any of these. Note that each feature is therefore potentially a stand-alone invention and may be combined with any one or more other feature or features.

A. A seedmat comprising a biodegradable base layer, a seed distribution and a biodegradable cover layer;
in which the seed distribution includes fertilizer granules or pellets that each have a coating, such as a polymer coating, that enables the pellets to absorb water and to slowly release that water, together with fertilizer.

B. A seedmat comprising a biodegradable base layer, a seed distribution and a biodegradable cover layer;
in which the cover layer is treated with or otherwise includes a bird repellent.

C. A seedmat comprising a biodegradable base layer, a seed distribution and a biodegradable cover layer;
in which the cover layer is treated with or otherwise includes a visual moisture indicator.

D. A seedmat comprising a biodegradable base layer, a seed distribution and a biodegradable cover layer;
in which the seedmat also includes a layer configured to resist burrowing by animals such as moles and gophers but to permit roots to pass through.

E. A seedmat comprising a biodegradable base layer, a seed distribution and a biodegradable cover layer;
in which the seedmat also includes a biodegradable water retention layer, the water retention layer being configured to retain water longer than any of the other layers, to provide water to the seeds in dry conditions.

F. A seedmat comprising a biodegradable base layer, a seed distribution and a biodegradable cover layer;
in which one or more of the layers are treated with or otherwise include biodegradable water retention substances, such as corn starch crystals, that function to retain water and to release that water slowly over a predefined or required time period and that also function as an adhesive to bind the base and cover layers together.

G. A seedmat comprising a biodegradable base layer, a seed distribution and a biodegradable cover layer;
in which one or more of the layers are treated with or otherwise include biodegradable water retention substances, such as corn starch crystals, that function to retain water and to release that water slowly over a predefined or required time period and that also function as an adhesive to stick the base layer, shaped when wet to highly conform to the soil on which it rests, to that soil.

H. A seedmat comprising a biodegradable base layer, a seed distribution and a biodegradable cover layer;
in which the seedmat includes fertilizer and the seedmat is configured as part of a hydroponic system which requires water, but nutrition is provide in whole or part through the fertilizer in the seedmat.

I. A seedmat comprising a biodegradable base layer, a seed distribution and a biodegradable cover layer;
in which the seedmat includes fertilizer and the seedmat is configured as part of a saline filtration system, and the biodegradable cover layer is configured to filter the saline so that water that is substantially less saline passes down to the seeds in the seed distribution.

J. A method of manufacturing a seedmat comprising a biodegradable base layer, a seed distribution and a biodegradable cover layer;
in which adhesive is sprayed onto one or both of the base layer or the cover layer, and that adhesive secures seeds in position; and in which the adhesive is applied using a centrifugal spray apparatus with multiple rotating spray heads.

A hybrid seedmat/artificial turf system comprising an artificial turf layer located on top of any of the seedmat of features A-J.

The following optional features can also be combined with any key feature and also any other optional feature:
a biodegradeable layer is made of a nonwoven material.
the nonwoven material is a cellulose nonwoven material.
the top and bottom layers are made of nonwoven cellulose fibres, and there is a layer or other distribution of fertilizer pellets, and a layer or other distribution of seeds mixed in with the fertilizers and all are distributed onto a wet glue or adhesive layer sprayed on the bottom layer.
fertilizer pellets and seeds are distributed substantially evenly onto the wet glue.
the wet glue is applied substantially evenly onto one of the layers using a centrifugal spray apparatus with multiple rotating spray heads.
the glue is a synthetic adhesive.
the glue is corn starch.
the grass seeds are passed through a gravity hopper feeding a brushed roller that evenly distributes the seed onto the wet, glued base layer surface so that the seed are maintained in position.
the fertiliser pellets are sprayed or sprinkled onto the wet glued base layer surface, and evenly distributed across the seeds.
the non-woven fabric is bio-degradable, highly water absorbent layer that, when wet, highly conforms to the substance the non-woven layer is resting on—e.g. the soil.

the nonwoven fabrics are configured to be strong enough when dry to enable high speed unrolling from a pair of large rolls of the fabric, high speed transit of the nonwoven fabrics through the manufacturing line that applies, glue or adhesive, fertiliser and seed, and completes the manufacture of the finished article.

the top non-woven layer is combined at high speed with the base layer, sandwiching the glued seeds and fertiliser pellets in position and creating a single, bonded structure, with the glue also binding the top and base layers together and this bonded structure is then passed at high speed between loaded rollers which further binds the top and base layers together and the composite is then wound at high speed to form a large roll of the finished article.

the fertiliser pellets have a polymer coating through which water can pass via osmosis so that the nutrients within a pellet are then slowly dissolved by the absorbed water but are not immediately released from the pellet but instead retained within the polymer wall of the pellet and only released over time, such as 30-50 days, or a time selected to be appropriate to support the germination and growth of the specific seeds in the seedmat.

the pellets are controlled release fertiliser pellets.

the top biodegradable layer includes a visual moisture indicator, such as a color-changing additive, to indicate when the mat needs watering.

the visual moisture indicator is configured to spell a brand name or replicate logo.

if the mat is sufficiently watered, then a word or logo becomes visible.

if the mat is insufficiently watered, then a word or logo becomes visible.

the seedmat includes a fine mesh layer that is resistant to burrowing animals.

the fine mesh is a nylon mesh.

the fine mesh is biodegradable, but at a rate that is considerably slower than the rate at which the top and base layers degrade.

the fine mesh is biodegradable only in sunlight or other conditions that do not apply whilst it is in the soil.

the seedmat includes a biodegradable water retention layer that is adjacent to the base layer.

the biodegradable water retention layer is a thick layer of nonwoven cellulose, configured for maximum slow release water absorption.

the biodegradable water retention layer includes additional water retention substances, such as corn starch crystals.

the seedmat includes a tackifier layer that contributes to the base layer conforming and sticking to the soil.

the seedmat is used as part of a hydroponic system which requires water but nutrition is provide in whole or part through the fertilizer in the seedmat.

APPENDIX 1

Background to the GROTRAX Seedmat System

The GROTRAX seedmat system is an article and method used in growing vegetation and, more particularly, to a seedbed and method for growing vegetation by applying seeds and fertilizer to a planting area and maintaining nutrients within this planting area in order promote germination and growth of predetermined vegetation. Grass seed is sown by various known procedures. These procedures include hand seeding, "hydro-seeding and using mats that form artificial seedbeds. Hand seeding is an old and well-known way of applying grass seed to the soil.

According to the hydro-seeding method, grass seeds are mixed in a dissolved fiber solution and are dispersed on the surface of the ground. In the methods that employ a mat as an artificial seedbed, the mat is placed on top of the soil in order to grow and keep germinated grass warm and moist.

Many forms of artificial seedbeds, including seedmats and carpets, intended for growing grass and other forms of vegetation are known in the art. A conventional such seedmat is disclosed in U.S. Pat. No. 4,190,981 to Muldner. This conventional seedmat includes a base layer of water pervious web material, a bed of seeds and compressed peat particles as a middle layer, and an upper layer comprising a fibrous, porous veil. However, this upper layer does not have sufficient wet strength to support and position the seeds after watering commences. Also, the upper layer can prematurely degrade, thereby exposing and failing to protect young seedlings from other elements and birds.

The GROTRAN seedmat system is an improved artificial seedbed, in effect, an engineered seedbed with predetermined physical properties that enhances safe sprouting and growth of young vegetation. The system provides an artificial seed bed with a lower layer that will be porous enough to allow roots to extend through it, but yet strong enough to Support the seeds and retain some of the temperature and humidity of the soil around the seeds during seed germination and growth. The system provides an artificial seedbed with an upper layer that has a density and porosity that allows extensive sprouting of the shoots from the seed, while still being strong enough to protect these sprouting shoots from their environment.

Summary of the GROTRAX Seedmat System

The GROTRAX seedmat system is an effective method for applying seed and fertilizer to a large area in a one-step process in order to cause the growth of a plant such as grass. The GROTRAX seedmat system includes a rolled product that carries seed and fertilizer contained in a biodegradable matrix of cellulose fibers and biodegradable binding adhesives. This matrix will allow for easy application and will initially protect the seeds, but will quickly compost into the soil and allow for normal turf maintenance in 4-6 weeks.

The seedbed can be used in residential applications and in commercial applications such as golf course construction and maintenance and roadway median maintenance as well as private home lawn and garden applications. Unlike conventional turf sodding or seeding practices, the GROTRAX seedmat system is less labor-intensive with respect to its lay-down and maintenance. The seedbed contains fertilizers eliminating the additional labor required for fertilizer lay-down with conventional seeding and Sodding methods. It also produces improved seed germination relative to conventional broadcast seeding methods and full ground coverage for improved erosion control that reduces the potential for serious environmental degradation of adjacent streams and wetland areas. Additionally, the full ground coverage provided by the present invention provides improved weed control that reduces and in some circumstances eliminates the need for pesticide applications. The stabilization provided by the layers of the laminate prevents migration due to wind and rain, especially on sloping terrains, thereby eliminating the need for expensive reworking. Also, the decomposition of cellulose adds organic matter to the base soil enhancing healthy plant growth and sustainability. In certain embodiments, the seedbed contains only natural, biodegradable components thereby eliminating the deposition of possibly undesirable synthetic materials in the environment. Additionally, the GROTRAX seedmat system can include a soil contacting layer that includes a conventional Soil conditioner.

The GROTRAN seedmat system is for growing vegetation. The seedmat comprises a base layer formed of a biodegradable product having a porosity and wet density that permit a root of the vegetation to penetrate the base layer and establish the vegetation for growth. The seedmat also comprises an inter mediate layer comprising a plurality of seeds for use in growing the vegetation. The article further comprises a cover layer that is coextensive with the base layer and secured to the base layer by a bonding agent. The cover layer is formed of the same biodegradable product as the base layer and has the same porosity and wet density as the base layer such that sprouting vegetation is capable of penetrating the cover layer.

The GROTRAX seedmat system comprises a base layer formed of a biodegradable natural fiber having a basis weight of about 23 to about 300 grams per square meter and a wet density of at least about 0.05 grams per cubic centimeter, and a cover layer formed of biodegradable natural fibers having a basis weight of about 13 to about 150 grams per square meter and a wet density of about 0.05 to about 0.20 grams per cubic centimeter. The article also comprises a biodegradable bonding agent for securing the base layer to the cover layer.

The GROTRAN seedmat system comprises a base layer formed of wood-derived cellulose fibers, and a cover layer formed of biodegradable natural fibers. The cover layer has a different porosity, a different basis weight and a different density compared to the base layer. The seedmat also comprises an intermediate layer between portions of said base layer and said cover layer. The intermediate layer includes a plurality of seeds for growing the vegetation. Further, the article comprises a bonding agent for securing the base layer to the cover layer such that the cover layer and base layer are sealed together to contain the seeds between the base layer and cover layer.

A method of making the seedmat comprises the steps of providing the base layer formed of biodegradable natural fibers, providing the cover layer formed of biodegradable natural fibers and applying seeds to one of the base layer and the cover layer such that the seeds are distributed on a predetermined portion of the layer to which they are applied. The method also includes the steps of applying the bonding agent to at least one of the layers and securing the cover layer to the base layer such that the cover layer and the base layer form an enclosure around the seeds.

DETAILED DESCRIPTION

Figure 4:
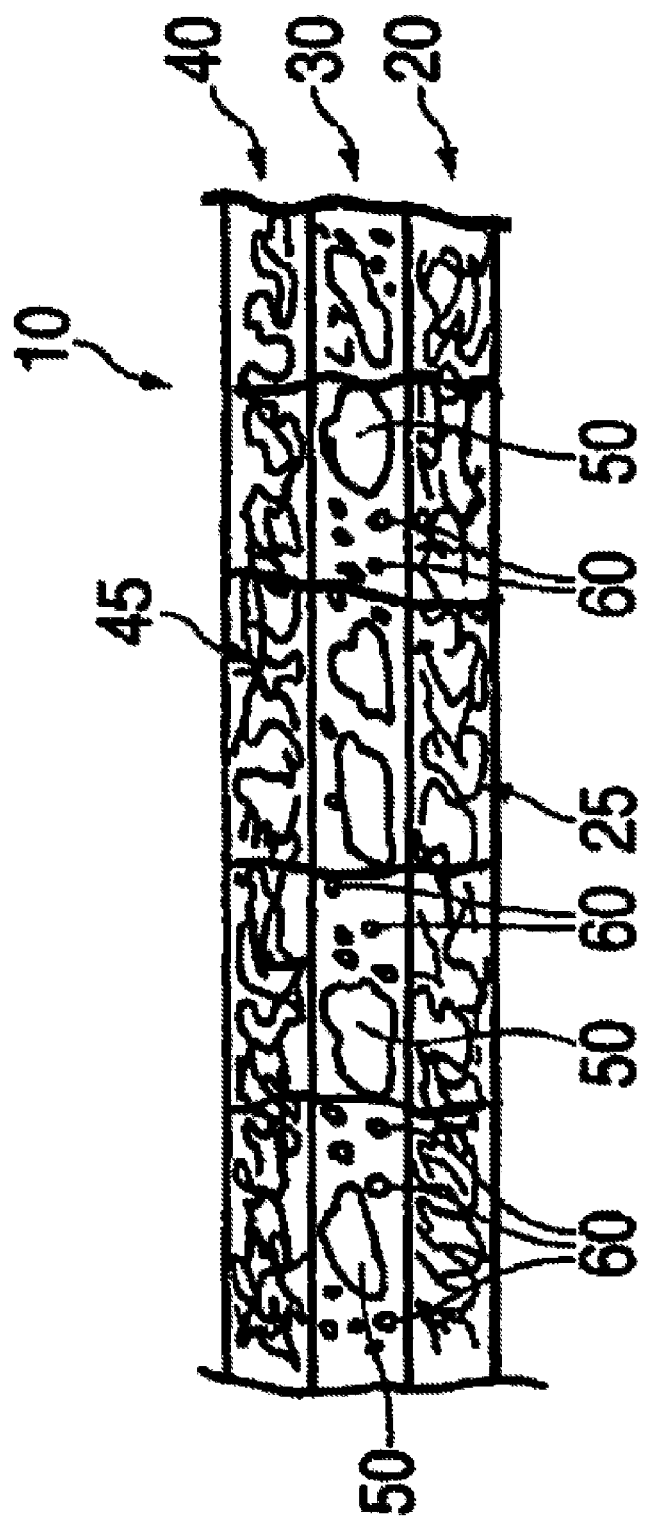
FIG. 4 shows a shows a 'Standard' GROTRAX seedmat.

As illustrated in FIG. 4, the present invention comprises a simulated seedbed 10 including a plurality of layers. This seedbed 10 can be delivered as a rolled or folded article and is used for growing vegetation. As used herein, the term "vegetation" relates to plants that grow from seeds.

Examples of vegetation include grass, vegetable plants, vegetable trees, fruit plants, fruit trees and flowering plants that do not produce either edible fruits or vegetables. However, for ease of explanation and understanding, the artificial seedbed 10 according to the present invention will be explained herein as it relates to grass seed. It is understood that the embodiments and concepts of the seedbed 10 discussed herein also apply to seedbeds 10 when they include seeds used to grow vegetation other than grass.

As shown in FIG. 4, the seedbed 10 includes a base layer 20, an intermediate layer 30 and a cover layer 40. The materials used to form the layers 20, 40 preferably include natural fibers that are biodegradable. Among the natural fibers suitable for use in accordance with the present invention are jute fiber, palm fiber, peat, sisal, coconut fiber and wood fiber. In an embodiment including jute fibers, the layer, for example cover layer 40, containing the jute fibers could have a basis weight of about 10 ounces per yard square.

In another embodiment, the base layer 20 and cover layer 40 are each formed of a natural, biodegradable product including wood-derived cellulose fibers, such as a paper product or a pulp product. The substrate 25 of layer 20 and substrate 45 of layer 40 are each formed of a different paper or pulp product and form a sealed envelope around layer 30.

The substrates 25, 45, and thus layers 20, 40, can be formed using one or a combination of the following known paper product forming processes: airlaid, wet laid, dry formed and thermoforming. In an embodiment, the wet laid tissue and toweling substrates have minimal wet-strength added. In a first airlaid embodiment, the airlaid substrates are bonded during a conventional airlaid process using known latex or synthetic fibers that binds to their cellulose.

These binders are non-biodegradable and may be included in varying amounts to control the degradation of one or more of the layers 20, 40. In another airlaid embodiment, the present invention includes completely biodegradable starch based binders. For example, the bonding agents can include a starch-based adhesive, such as potato starch, modified cellulose or polyvinyl alcohol. The starch binder, for example, will provide biodegradability while still providing good dry strength to its respective layer during field application. In an embodiment, a layer of wet-strength material is included in the seedbed 10 to provide a compromise between biodegradability and durability.

The materials used to form the base layer 20 and cover layer 40 have a low enough basis weight, low enough density and high enough porosity to allow good penetration of the grass roots and shoots, respectively. In an embodiment, the basis weights for wet laid products used for base layer 20 and cover layer 40 can range from about 10 to 100 pounds per 3000 square feet. Another preferred range is from about 13 to 50 pounds per 3000 square feet. Additionally, the basis weight range for airlaid products used for both the base layer 20 and the cover layer 40 can be from about 50 to 500 grams per square meter. The above-discussed layers 20, 40 each have porosity in the range of about 25-500 CFM/ft2. The tensile strength of the layers 20, 40 is sufficient to allow the seedbed 10 to be applied without breaking. In an embodiment, the tensile break strength should be between about 2 to 50 N/5 cm and have a tensile elongation of between about 1 to 20%. In at least one of the disclosed embodiments, the layers 20, 40 are biodegradable to the point that it will allow normal mowing in 4-6 weeks of its application. Additionally, the layers 20, 40 have a coherent enough matrix to prevent their material and the intermediate layer 30 from being washed away in rainy conditions.

In an embodiment, the cover layer 40 has greater porosity and lower density compared to the base layer 20 because the shoots from a grass seed are not as strong as the roots of the grass seed. The greater porosity and lower density of the cover layer 40 permit the shoots from the grass seeds 50 to grow through the cover layer 40 without significant opposition and to permit adequate sun to meet with the contained seeds 50. It is contemplated that the cover layer 40 be formed of a substrate that is as light and porous as possible, while still maintaining enough strength to not prematurely disintegrate or blow away. On the other hand, the base layer 20 is a heavier, stronger and denser product when compared to the cover layer 40. This denser and less porous base layer 20 will retain the heat and humidity around the grass seed that aids in germination, while still being porous enough to allow the roots of the grass seedlings to penetrate through it and mesh with the ground. The strength of the base layer 20 also provides the seedbed 10 with the support it needs until sufficient germination has occurred and the grass blades are viable. The layers 20, 40 may be formed of the same material as illustrated in certain examples in Table 1 (see FIGS. 11 and 12). In these embodiments, the layers 20, 40 surrounding the intermediate layer 30 can have the same basis weight, wet density and porosity.

A raw pulp sheet could be used for either of the layers 20, 40. The pulp sheet provides the strength needed for the base sheet 20. The use of raw pulp sheets for either layer 20, 40 would allow the use of cellulose without the expensive and time consuming pulp converting step conventionally performed on a paper substrate using a known method such as airlaying. However, the chosen raw pulp sheet must be porous enough and have a low enough density to permit the roots or shoots of the grass seed to penetrate through it and establish themselves.

The intermediate layer 30 includes seeds 50 and fertilizer 60. In an embodiment, intermediate layer 30 can also includes other nutrients, growth and/or germination aids that may be desired for the growth of the grass. The intermediate layer also receives the adhesive material used to secure the base layer 20 and the cover layer 40 together around the intermediate layer 30 as they are secured together so that the seeds 50 and fertilizer 60 are securely held in place within the seedbed 10 as discussed below.

Figure 9:
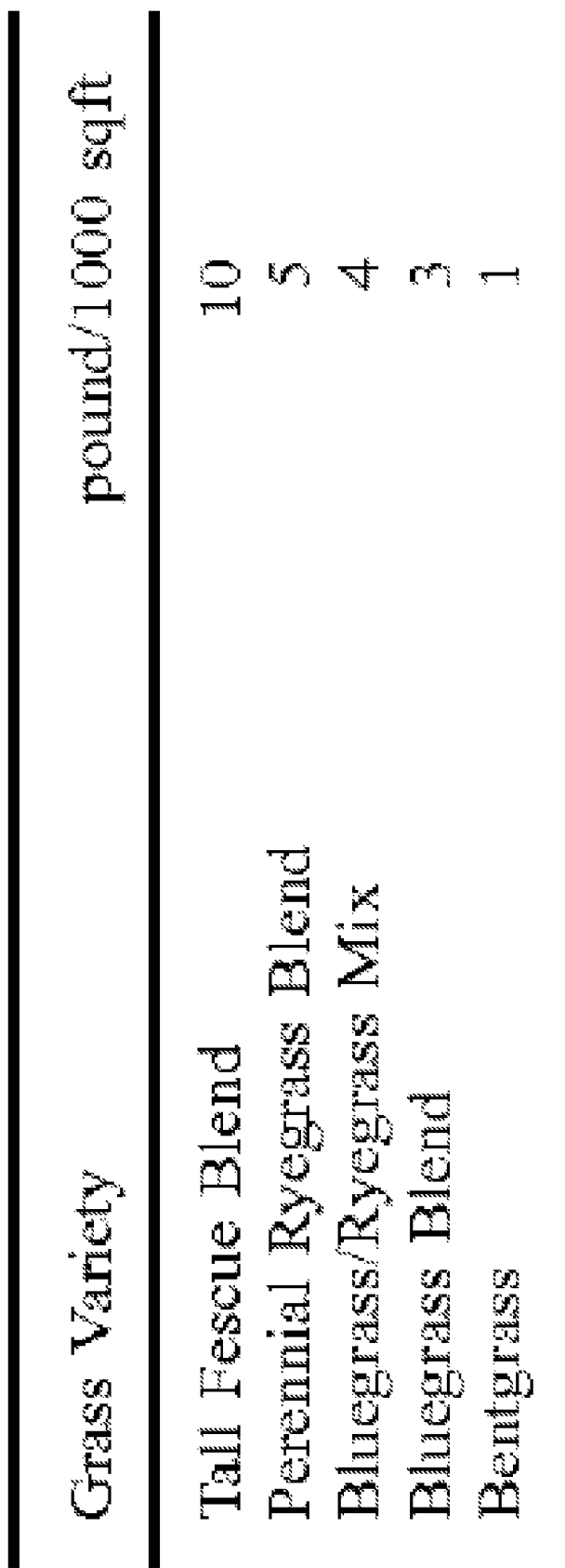
FIG. 9 is a table listing the dosing of seeds per 1000 sq feet of ground to be treated.

The seeds 50 located within the seedbed 10 formed by any of the above-discussed embodiments can be any know type of seed that meets the needs of the end user. For example, the grass seed that forms a portion of layer 30 can be any known grass seed. However, the contained seed or combination of different grass seeds will be dictated by the type of grass to be grown and the geographical location where the grass will be established. As understood, the grass seed used for a golf course fairway will be different from the grass seed used for a putting green on the same course. Similarly, the grass seed/seed mixture for a golf course in Georgia may be different from that used for an industrial park in Oregon or a residential lawn in New Hampshire. Therefore, the grass seed mixture that forms layer 30 can differ from customer to customer, as well as, use to use for the same customer. The seeds used for this product can be of varying types depending on the needs of the customer. In an embodiment, the dosing of seeds in the matrix will be on the order of about 1 to 10 pounds per 1000 square feet of ground to be treated as set forth in FIG. 9.

Other types of seeds, for instance those used for growing flowers and vegetables, could also be incorporated in with other types of seeds or replace the grass seed within the seed bed. Additionally, embossing or laminating the base layer 20 and the cover layer 40 so that at least two compartments contain different seeds enable different vegetation to grow from different compartments of the same seedbed 10. As a result, a user can plant a pre-organized garden that will provide predetermined plant growth and a predetermined array of vegetation.

As discussed above, the intermediate layer 30 of seeds 50 and fertilizer 60 is located between the bottom layer 20 and the cover layer 40. The intermediate layer 30 can include those nutrients that assist in the growth and/or timing of germination for the vegetation, such as products including peat and lime.

The fertilizers 60 can include natural or chemical fertilizers or other known additives that aid the growth process of the vegetation. The fertilizer(s) can form part of the matrix of the total seedbed 10 by being introduced onto or into at least one layer 20, 40 of the seedbed 10. For example, a fertilizer can be applied to a surface of the top layer 40 that faces toward the base layer 20. In another embodiment, the fertilizer 60 can be applied to any surface of either of the layers 20, 40. In yet another embodiment, the fertilizer 60 can be formed into one of the layers 20, 40 during the production of the layers 20, 40. Any combination of steps for applying fertilizer to the layers 20, 40 can also be used. More specifically, the fertilizer 60 can be added to the seedbed 10 by pouring or otherwise applying a granular or powdered fertilizer onto the base layer 20 and in the same layer as the grass seed 50.

In an alternative embodiment, the fertilizer 60 takes the form of a liquid that can be sprayed onto the base layer 20, the cover layer 40 or both layers 20, 40. In order to reduce production steps, the fertilizer 60 can be sprayed onto the base layer 20 and/or cover layer 40 simultaneously with the adhesive that is applied to these layers 20, 40 before these layers 20, 40 are laminated together. For example, a liquid fertilizer could be mixed into the solution (potato starch) used to bind the individual layers or into the glue used to laminate the substrates together. Spraying of the fertilizer gives controlled, even distribution of the fertilizer. Controlled distribution can reduce fertilizer costs and provide more even growth. The liquid fertilizer 60 can also be sprayed directly onto the seeds 50 so that it covers the seeds 50.

The fertilizer 60 may also be applied as a coating to the seeds 50 before the seeds are introduced into the seedbed 10. Such coatings are disclosed in U.S. Pat. No. 6,209,259 to Madigan et al. and U.S. Pat. No. 4,753,035 to Ryan et al., both of which are expressly incorporated herein by reference. The use of coated seeds 50 can increase the ability of the manufacturer to control the amount of fertilizer 60 introduced into the seedbed 10 for each seed 50. Coating the seeds 50 with a fertilizer and other nutrients also increases the proximity of the fertilizer 60 and other introduced nutrients to the seeds 50 in order to allow the seeds to use the nutrients more efficiently and reduces the amount of fertilizer 60 and other nutrients required. The fertilizer-coated seeds 50 also allow both seeds and fertilizer to be added to the product in one step, thereby reducing the number of production steps required to produce the seedbed 10.

The fertilizer 60 may include slow release nitrogen so that the initial sprouts from the seed will not be burned, and is high in phosphorus and potassium to provide stimulation for good root development. As with the type of grass seed, the fertilizer 60 can differ based on the needs of the client and the vegetation being grown. For example, one type of grass or seed may require a different ratio of nitrogen, phosphorus and potassium than another type of seed. As a result, the provided fertilizer 60 will change to complement the seed within the seedbed 10 that has been chosen in response to the needs of the customer.

The nitrogen portion of the fertilizer 60 may include a controlled release product that will allow the turf to perform well during an extended portion of the growing season.

A nitrogen release term of 3-8 months is typically preferred. In order to secure the seeds 50 and fertilizer 60 between the layers 20, 40, the present invention includes the steps of securing the layers together along its outer edges, at multiple locations along their interior facing surfaces or over their entire interior facing surfaces. In an embodiment, a bonding agent is applied to the interior facing surfaces of layers 20, 40 so that it holds these layers together as a unit after it has been laminated. As a result, the seed 50 will be securely contained between the two layers 20, 40. The bonding agent can include any of the discussed biodegradable substances such as starches, modified celluloses or alcohol-based materials such as PVOH or PVA that can be used to secure two members together. Other conventional adhesives that could be used to secure the layers 20, 40 of the seedbed 10 together or as binders for each airlaid layer include cellulose ethers, acrylics, EVA and EVA latex. It is also possible to use water as the adhesive or binding agent when used in combination with a water activated starch or other binder. Paper industry standard amounts of wet strength resin used in airlaid, tissue and towel production can be used in the bonding agent to provide a small amount of temporary wet strength that could be useful for seedbed 10 integrity during the initial germination period.

The layers 20, 40 can be secured together along the perimeter of one or both layers 20, 40 and at positions that are extended inward from the perimeters. In this embodiment, the inwardly extending lines along which the layers 20, 40 are secured together can create pockets within the intermediate layer 30 for holding the seeds for growing the desired vegetation. These pockets can include the same seed(s), different seeds, a mixture of seed(s), fertilizer and/or nutrients for growing the desired vegetation(s). Accordingly, different vegetation can be grown using the same artificial seedbed 10.

In an alternative embodiment, the layers 20, 40 are secured together by embossing or perf-embossing. This would eliminate the use of water-based adhesives that might require drying.

Figure 5:
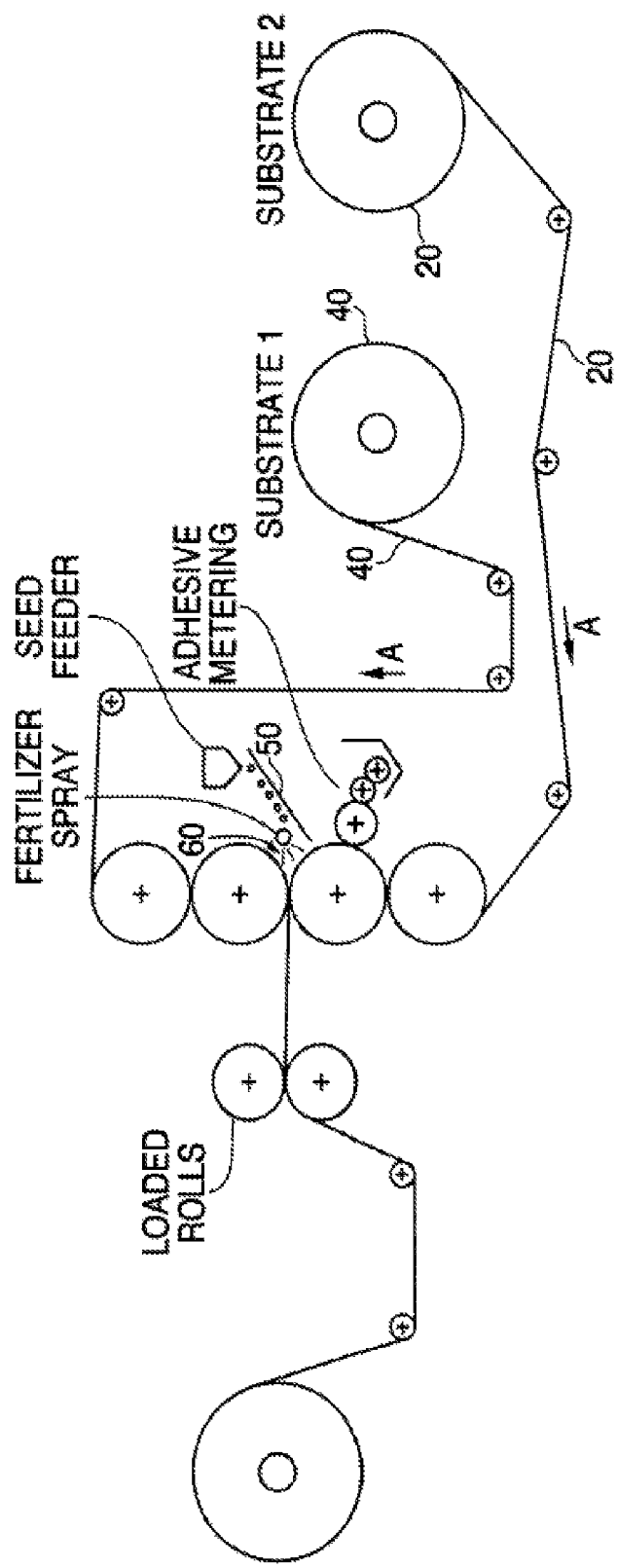
FIG. 5 is a schematic of the production equipment used to mass produce rolls of GROTRAX seedmats at high speed.

Referring now to FIG. 5, there is shown an apparatus and method for making an artificial seedbed 10 according to the present invention. Biodegradable sheets of natural fibers for the base layer 20 and the cover layer 40 are moved in the direction of the arrows A, B, respectively. As discussed above, the seedbed 10 will be understood to be made up substantially entirely of such natural fibers, although it may contain a small proportion of synthetic fibers, which may be provided in order to decrease the rate of decomposition of the resulting mat 30 when laid on the earth. The overall process according to an embodiment of the present invention will include making the individual layers using desired techniques, and then marrying layers 20, 40 together on the laminating line illustrated in FIG. 5. The cover layer 40 and base layer 20 will not necessarily be matching materials. In an embodiment, the seedbed 10 includes a heavier base layer 20 (such as an airlaid product) and a lighter cover layer 40 (such as tissue or towel formed using wet laiding). This will provide for good tensile strength while allowing the grass shoots to penetrate the cover sheet 40 easily.

Once the layers 20, 40 have been formed, they are laminated together around layer 30 as shown in FIG. 5. On the laminating line illustrated in FIG. 5, the adhesive will be added to the base layer 20. However, the adhesive could also be added to the cover layer 40 or both layers 20, 40. The adhesive can be applied using either a spray header or by passing the material of either or both layers 20, 40 through a coater. In an embodiment, a coater is used to apply a light coating of adhesive to the base layer 20 that does not require oven drying of the seedbed 10. However, it may be possible to pass the seedbed 10 through a high-temperature oven and drive off the majority of the water without raising the temperature of the seeds above the critical mark of approximately 140 degrees Fahrenheit. The liquid fertilizer may be a component of this adhesive and thereby applied simultaneously with the adhesive. As shown in FIG. 5, the seed can be added using a hopper-style feeder. The hopper will allow feed-rate adjustments so that the desired seed distribution and density can be achieved. The adhesive will not only allow the cover layer 40 to adhere to the base layer 20, but will also secure the seeds to the bottom substrate 20. The seeds 50 should be added as close as possible to the point where the cover layer 40 meets the base layer 20 along the lamination machine. This will quickly fix the seeds in place and minimize material loss. If granular fertilizer is used, it can be added with a hopper feeder separate from that used for the seed or in the same hopper as the seed. However, the changing size ratios with different seeds could make it difficult to get an even distribution of seed and fertilizer when using a seed/fertilizer mix in a single hopper. After the addition of the seed 50, fertilizer 60, and the adhesive, the layers 20, 40 are secured together. The laminating roll must be soft enough to bond the substrates without crushing the seeds. The formed seedbed 10 can have a diameter and width that will be relatively convenient to handle. In one embodiment, the seedbed 10 may have a diameter of about 24 to 36 inches and a width of 72 inches (24-36" D×72" W). The size of the product will vary with its application. For example, a home-oriented product would likely be smaller and lighter than that used for commercial or industrial application.

In another embodiment of a method for forming the seedbed 10, the seeds are applied onto a layer of loose paper fibers. Next, the seeds are covered by a second layer of fibers and a binding adhesive is sprayed over the seeds and loose fibers in order to form a three layered structure that includes grass seeds positioned between two fibrous layers having different density and porosity characteristics. In another embodiment, fibers that form a cover layer and seeds are both simultaneously released from a hopper and placed on a previously formed paper base layer. Then, a binding agent is applied to secure the fibers of the cover layer that are mixed with the seeds to each other, the seeds and the base layer. It is also possible that super absorbent polymers (SAP) could be added to the seedbed 10 in order to provide a vehicle for supplying more water to the seeds 50. However, this could increase production times and production costs. Also, a finished seedbed 10 with more than two paper layers having separate seed and/or fertilizer types incorporated between the various layers could also be formed. In another embodiment, the fertilizer 60 is added to the airlaid layer during the initial production of that layer in order to reduce the total number of manufacturing steps needed to form the seedbed 10.

In testing of the present invention, numerous layers of different materials were produced. These layers included pulp sheets, tissue, towel, and airlaid products. It was found that in some embodiments that airlaid substrates work well as base layers, but as cover layers they have a slower grass shoot penetration rate. In general, grass roots are better at penetrating a substrate than are grass shoots. Therefore, in an embodiment, a lightweight material, such as a tissue or towel, will likely be used as the cover layer 40 and a porous heavier material such as an airlaid substrate will likely be used as the base layer 20. This porous heavier material used as the base layer 20 can provide the needed strength that the lightweight cover layer 40 cannot provide as well as being porous enough to allow the roots to penetrate through to the soil.

Samples of the seedbed 10 were developed and analyzed. In an embodiment, the seedbed 10 includes between about 4 to 8 pounds per 1000 square feet of fescue grass seed. However, as mentioned above, the seedbed 10 could include between 10 and 12 pounds of seed per 1000 square feet. Conventionally, seed is provided at 10 pounds per 1000 square feet, so that by providing seed at 12 pounds per 1000 square feet, this implementation is much more likely to provide a dense growth of grass. In this embodiment, the seed is "STARFIRE' available from Columbia Seed Company. The fertilizer 60 in this embodiment includes Regal Liquid Green Dec. 6, 2012 fertilizer applied to at least one of the layers 20, 40 at a rate of 32 fluid ounces per 1000 square feet. The binding material used to adhere the layers 20, 40 together as a single unit about intermediate layer 30 includes a biodegradable adhesive such as polyvinyl alcohol sold by H. B. Fuller under the name WB2746 polybond adhesive. This binding material was applied at a rate of one fluid ounce per 1000 square feet.

The base layer 20 and cover 40 were selected from the Table in FIG. 10. Any combination of these paper layers could be used in a single seedbed 10. In the embodiments of the above samples (1-6), the airlaid sheets are conventionally formed and bonded using StructureCote 1891 binder from Vinamul Polymers of Bridgewater, N.J. applied at about 7 to 10 percent dry weight basis. The tissues set forth above in samples 1-4 are conventional wet laid materials manufactured without the addition of a wet strength resin by a conventional wet-laid process. The towel would be in a basis weight range of about 16 to 24 pounds per 3000 square feet (26-39 gsm) while the tissue could be at least as low as about 13 to 18 gsm.

Though hydrogen bonding will take the place of a separate binder, there still may be some need for low-level wet-strength chemical addition with the tissues and towels in order to provide added durability in rainy conditions during seed establishment. The 13-pound tissue is grade #65 from Georgia-Pacific Corporation ("Georgia Pacific'). The 22-pound tissue is grade #68 from Georgia Pacific.

Numerous additional samples of the seedbed 10 were tested. The results are shown in Table 1 (FIGS. 11 and 12) and FIGS. 6-8 that include graphs 1-3. Sample #16 was successful in that it had an 81% seed germination rate with an 81% seed penetration rate. This sample was constructed with a tissue top and a thermo-bonded airlaid material bottom. The combination of a lightweight top sheet and a heavier bottom sheet seems to be an effective combination of materials. The lightweight cover layer 40 allows sufficient shoot penetration while the heavier base layer 20 gives the seedbed 10 the strength it will need. Many of the samples tested had superior germination rates compared to the conventional broadcast seeding control sample.

Of the eighteen samples that were constructed and tested, with the exception of sample #7, each sample contained 192 SCOTTS ryegrass seeds and 0.5 g of 20-27-5 SCOTTS starter fertilizer sandwiched between the base layer 20 and the cover layer 40. Sample #7 contained only 88 ryegrass seeds and 0.25 g of 20-27-5 starter fertilizer (due to its size and shape). A potato starch solution was used to bond the sheets of the cover layer 40 to the base layer 20. The samples were constructed by 1) spreading the fertilizer over one of the layers 20, 40; 2) placing three seeds per square inch onto one of the layers 20, 40; 3) spraying approximately 25 g of starch solution over the seeds positioned within the seedbed 10; and 4) placing the other of the layers 20, 40 of sheet over the seed 50 supporting layer and pressing firmly. The seedbed 10 was then allowed to dry overnight. After the samples dried, each sample was placed in a plastic tray (11 inch diameter), which contained 1.5 inches of damp potting soil. Initially, each sample received 200 mL. of water per day. However, the amount of water was later reduced to 100 mL per day. The sample trays were placed under growing lamps for 12 hours per day. On a daily basis, the number of grass shoots that had penetrated the top sheet were counted.

General comments pertaining to each sample were noted, such as development of slime spots, cracks, and biodegradability. After twenty-two days the experiment was stopped. Then, the total number of shoots, including the ones that grew but did not penetrate through the cover layer 40, were counted and a percent germination was calculated.

Figure 6:
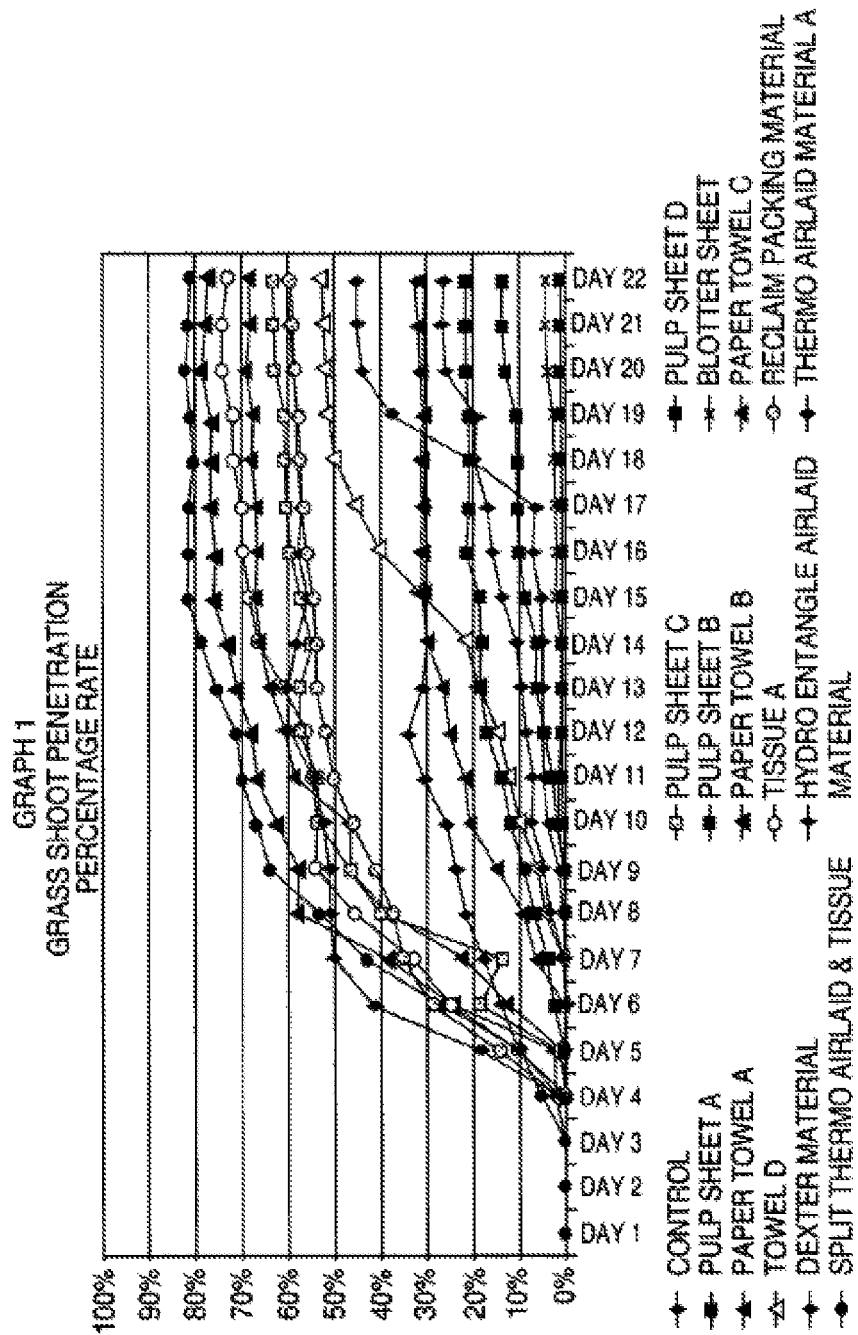
FIGS. 6-8 are graphs depicting test results for different types of GROTRAX seedmats.
Figure 7:
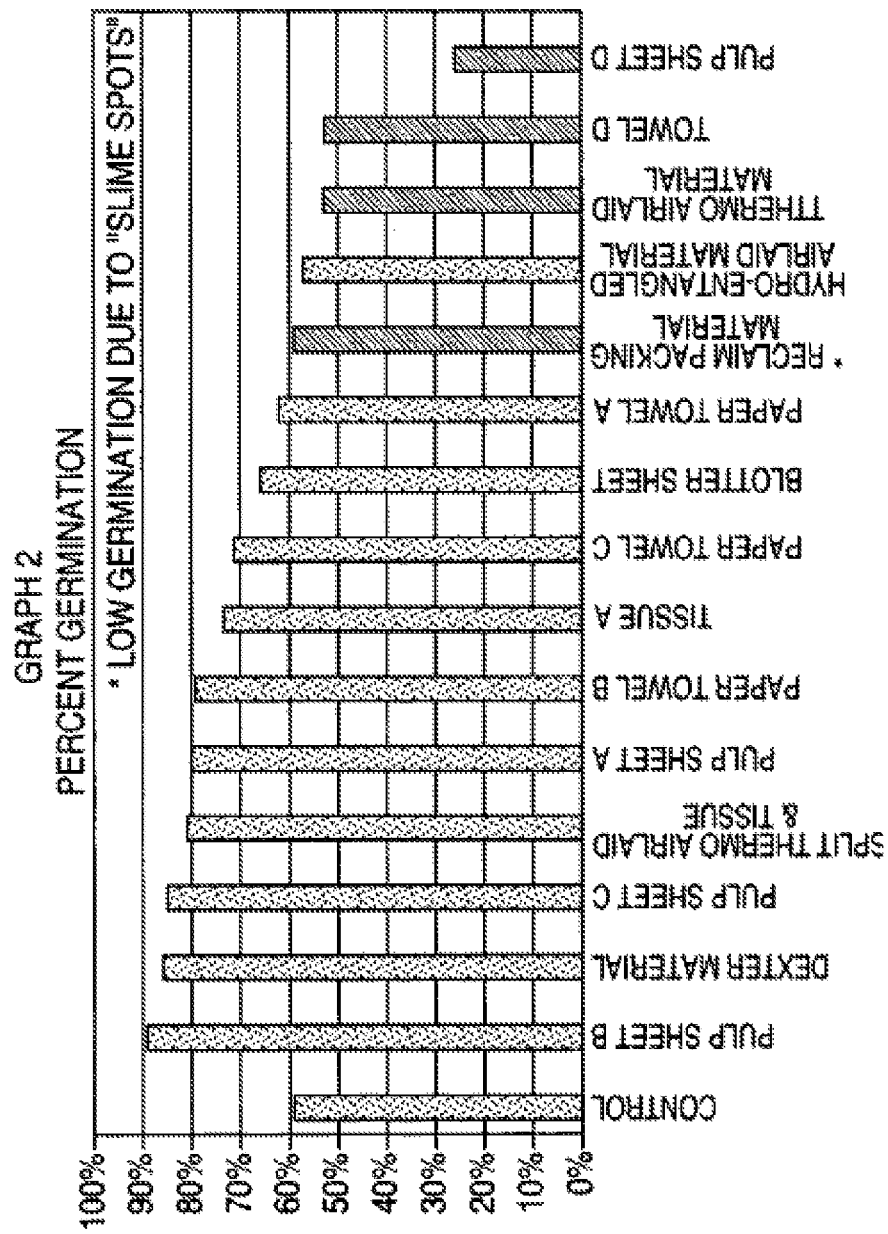
Figure 8:
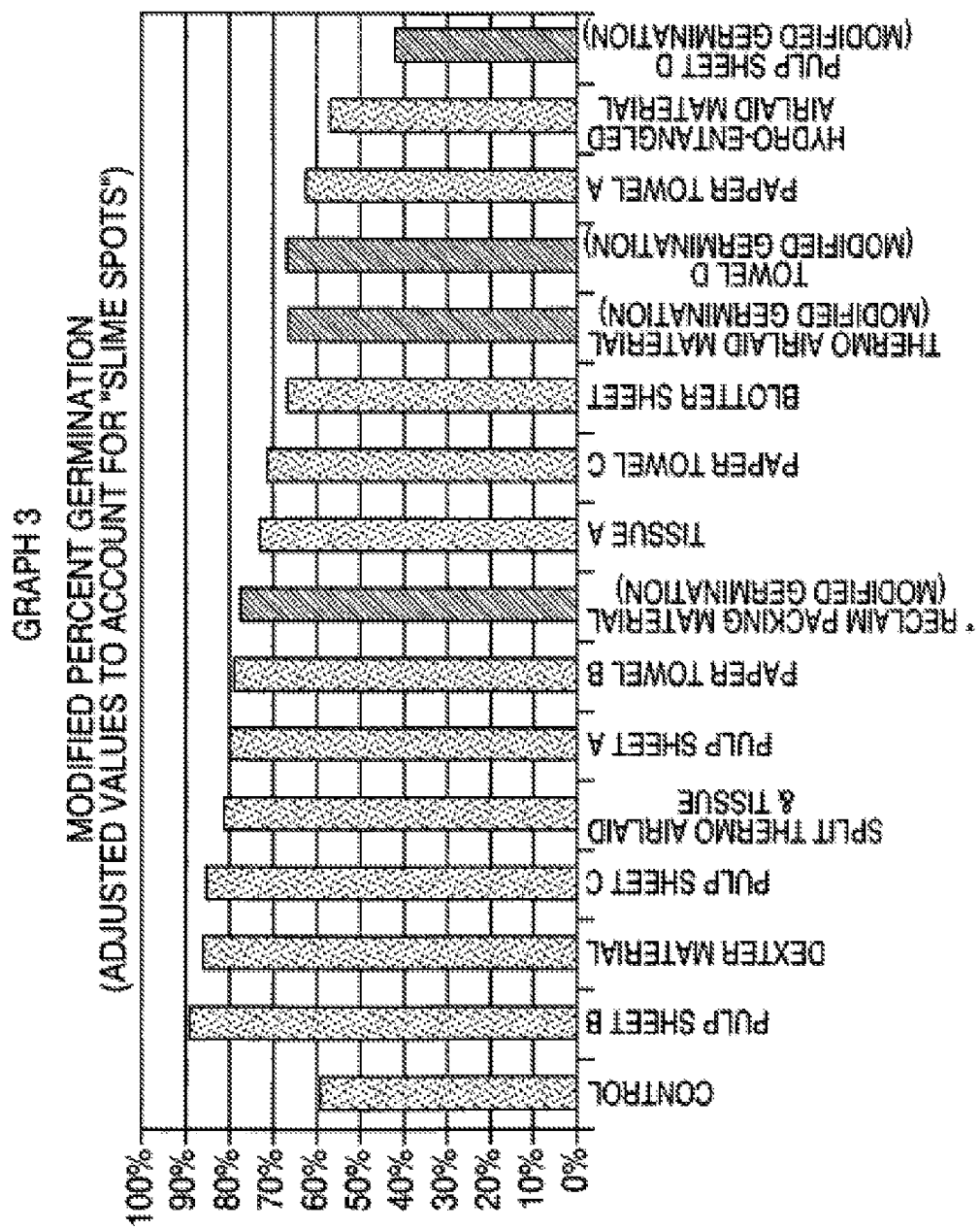

Table 1 (FIGS. 11 and 12) contains a brief sample description, a construction description and an overall rating of sample performance. Table 1 also contains information on the properties of the materials used to construct each sample. In FIG. 6, Graph 1 shows information pertaining to the number of shoots that actually penetrated through the top sheet of the sample. In FIG. 7, Graph 2 depicts percent germination information. In FIG. 8, Graph 3 depicts the modified percent germination information. To obtain this modified percent germination information, the total number of seeds affected by slime spots per sample was calculated. Then an adjustment to the total number of seeds planted was made to account for the number of seeds negatively affected by the slime spots. Example, sample #8 developed a slime spot with a total area of 14.8 in.

There are 3 seeds per square inch. So, 14.8×3-44 seeds that were negatively affected by the slime spot. Originally, each sample contained 192 seeds. So, 192−44=148 modified total number of seeds for this sample. This modified total number of seeds would be used to calculate the modified percent germination information. The slime spots were attributed to the level of watering provided to the seedbed 10, not the types of materials in which they appear.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A seedmat suitable for laying on a soil, the seedmat comprising a biodegradable base layer, a seed distribution layer and a biodegradable cover layer;

wherein the seed distribution layer includes fertilizer granules or pellets that each have a coating that enables the fertilizer granules or pellets to absorb water and to slowly release that water, together with fertilizer;

wherein the seedmat also includes a biodegradable water retention layer that is configured to have a wet density higher than at least one of the biodegradable base layer, the seed distribution layer and the cover layer, to provide water to seeds in dry conditions;

wherein the biodegradable water retention layer is a layer of nonwoven cellulose configured to release stored water; and wherein the seedmat includes a tackifier layer integrated as part of the biodegradable base layer, the tackifier layer enabling the biodegradable base layer to conform and stick to the soil, including uneven or irregular soil surfaces, without the use of external adhesive; and wherein the tackifier layer, when wet, enables the biodegradable base layer, to become mouldable and conform to the soil including uneven or irregular soil surfaces.

2. The seedmat of claim 1, wherein the cover layer is treated with or otherwise includes a bird repellent.

3. The seedmat of claim 1, wherein the cover layer is treated with or otherwise includes a visual moisture indicator.

4. The seedmat of claim 1, wherein the seedmat also includes a layer located between the biodegradable base layer and the seed distribution layer, that is configured to resist burrowing by animals but to permit roots to pass through.

5. The seedmat of claim 1, wherein one or more of the layers are treated with or otherwise include biodegradable water retention substances that function to retain water and to release that water slowly over a predefined or required time period and that also function as an adhesive to bind the base and cover layers together.

6. The seedmat of claim 1, wherein one or more of the layers are treated with or otherwise include biodegradable water retention substances that function to retain water and to release that water slowly over a predefined or required time period and that also function as an adhesive to stick the biodegradable base layer, shaped when wet to conform to a soil on which the biodegradable base layer rests, to the soil.

7. The seedmat of claim 1, wherein the seedmat is configured as part of a saline filtration system, and the biodegradable cover layer is configured to filter saline so that water that is substantially less saline passes down to the seeds in the seed distribution layer.

8. The seedmat of claim 1, the seedmat further comprising an artificial turf layer located on top of the biodegradable cover layer.

9. The seedmat of claim 1, wherein the cover layer and the biodegradable base layer are made of nonwoven cellulose fibres, and in which seeds are mixed in with the fertilizers in the seed distribution layer and the seeds mixed with the fertilizers are distributed onto a wet glue or adhesive layer sprayed on the biodegradable base layer.

10. The seedmat of claim 9, wherein the wet glue is a synthetic adhesive.

11. The seedmat of claim 9, wherein the wet glue is corn starch.

12. The seedmat of claim 1, wherein the fertilizer granules or pellets and seeds are distributed substantially evenly onto a wet glue in the seed distribution layer.

13. The seedmat of claim 1, wherein a wet glue is applied substantially evenly onto one of the layers using a centrifugal spray apparatus with multiple rotating spray heads.

14. The seedmat of claim 1, wherein the seeds are grass seeds and are passed through a gravity hopper feeding a brushed roller that evenly distributes the seeds onto a wet, glued base layer surface so that the seeds are maintained in position.

15. The seedmat of claim 14, wherein the fertilizer granules or pellets are sprayed or sprinkled onto the wet glued base layer surface, and evenly distributed across the seeds.

16. The seedmat of claim 1, wherein the nonwoven cellulose is a bio-degradable, water absorbent layer that, when wet, conforms to the substance the non-woven layer is resting on.

17. The seedmat of claim 1, wherein the fertilizer granules or pellets have a polymer coating through which water can pass via osmosis so that nutrients within the fertilizer granules or pellets are then slowly dissolved by absorbed water but are not immediately released from the pellet but instead are retained within a polymer wall of the polymer coating of the pellet and only released over time.

18. The seedmat of claim 1, wherein the fertilizer granules or pellets are controlled-release fertilizer granules or pellets.

19. The seedmat of claim 1, wherein the cover layer includes a visual moisture indicator to indicate when the seedmat needs watering.

20. The seedmat of claim 19, wherein the visual moisture indicator is configured to spell a brand name or replicate logo and if the seedmat is sufficiently watered, then the brand name or logo becomes visible.

21. The seedmat of claim 19, wherein if the seedmat is insufficiently watered, then a word or logo becomes visible.

22. The seedmat of claim 1, wherein the seedmat includes a fine mesh layer that is resistant to burrowing animals.

23. The seedmat of claim 22, wherein the fine mesh is a nylon mesh.

24. The seedmat of claim 22, wherein the fine mesh is biodegradable, but at a rate that is considerably slower than the rate at which the cover and base layers degrade.

25. The seedmat of claim 22, wherein the fine mesh is biodegradable only in sunlight.

26. The seedmat of claim 1, wherein the biodegradable water retention layer is adjacent to the biodegradable base layer.

27. The seedmat of claim 1, wherein the biodegradable water retention layer is a thick layer of nonwoven cellulose, configured to release stored water slowly.

28. The seedmat of claim 1, wherein the biodegradable water retention layer includes additional water retention substances.

29. The seedmat of claim 1, wherein the coating is a polymer coating.

30. The seedmat of claim 1, wherein the seedmat is configured to provide enhanced erosion control by maintaining moisture at the soil surface during initial watering, allowing the nonwoven cellulose to biodegrade, and promoting root establishment to improve soil structure drainage.

31. A method of manufacturing a seedmat suitable for laying on a soil, the seedmat comprising a biodegradable base layer, a seed distribution and a biodegradable cover layer;

wherein the seed distribution includes fertilizer granules or pellets that each have a coating that enables the fertilizer granules or pellets to absorb water and to slowly release that water, together with fertilizer; and wherein the method includes the steps of (i) spraying adhesive onto one or both of the biodegradable base layer or the cover layer, that the adhesive securing seeds in position; and (ii) applying the adhesive using a centrifugal spray apparatus with multiple rotating spray heads;

wherein the seedmat also includes a biodegradable water retention layer that is configured to have a wet density higher than at least one of the biodegradable base layer, the seed distribution layer and the cover layer to provide water to the seeds in dry conditions;

wherein the biodegradable water retention layer is a layer of nonwoven cellulose configured to release stored water; and wherein the seedmat includes a tackifier layer integrated as part of the biodegradable base layer, the tackifier layer enabling the biodegradable base layer to conform and stick to the soil, including uneven or irregular soil surfaces, without the use of external adhesive; and
wherein the tackifier layer, when wet, enables the biodegradable base layer, to become mouldable and conform to the soil including uneven or irregular soil surfaces.

\* \* \* \* \*